US012580347B2

(12) United States Patent
Maeda

(10) Patent No.: US 12,580,347 B2
(45) Date of Patent: Mar. 17, 2026

(54) ELECTRICAL CONNECTOR AND ELECTRICAL CONNECTOR SET INCLUDING THE SAME

(71) Applicant: Murata Manufacturing Co., Ltd., Kyoto-fu (JP)

(72) Inventor: Yoshiro Maeda, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 514 days.

(21) Appl. No.: 18/065,476

(22) Filed: Dec. 13, 2022

(65) Prior Publication Data

US 2023/0216249 A1 Jul. 6, 2023

(30) Foreign Application Priority Data

Jan. 6, 2022 (JP) ................................ 2022-001185

(51) Int. Cl.

*H01R 13/6471* (2011.01)
*H01R 12/71* (2011.01)
*H01R 13/05* (2006.01)
*H01R 13/11* (2006.01)

(52) U.S. Cl.

CPC ....... *H01R 13/6471* (2013.01); *H01R 12/716* (2013.01); *H01R 13/05* (2013.01); *H01R 13/11* (2013.01); *H01R 12/714* (2013.01)

(58) Field of Classification Search

CPC . H01R 12/716; H01R 13/405; H01R 13/6597
See application file for complete search history.

(56) References Cited

U.S. PATENT DOCUMENTS 8,858,243 B2 * 10/2014 Luo ........................ H01R 31/08 439/607.05
9,912,089 B2 * 3/2018 Akiguchi ............... H01R 13/14
10,084,265 B2 * 9/2018 Ozeki ................ H01R 13/6594
10,355,422 B2 * 7/2019 Sakaizawa ......... H01R 13/6597
10,644,420 B1 * 5/2020 Ishida .................... H01R 13/11
11,495,919 B2 * 11/2022 Oosaka .............. H01R 13/6471
11,509,083 B2 * 11/2022 Lee ........................ H01R 12/79
11,522,309 B2 * 12/2022 Yanase ................. H01R 13/193
11,527,847 B2 * 12/2022 Oosaka ................ H01R 13/518
11,552,419 B2 * 1/2023 Obata .................... H01R 12/91
11,563,288 B2 * 1/2023 Oosaka ................ H01R 13/518
11,569,599 B2 * 1/2023 Hayashi ................. H01R 12/73

(Continued)

FOREIGN PATENT DOCUMENTS

CN 213484122 U * 6/2021
CN 113823954 A * 12/2021 ........... H01R 13/652

(Continued)

*Primary Examiner* — Marcus E Harcum
(74) *Attorney, Agent, or Firm* — Studebaker Brackett PLLC

(57) ABSTRACT

An electrical connector includes a holding member that is electrically insulating, and a signal terminal and a male ground terminal held by the holding member. The male ground terminal is disposed next to the signal terminal. The male ground terminal includes a frame projecting in side view, and a cavity formed inside the frame. The male ground terminal includes a shielding part that is conductive and configured to electromagnetically shield the cavity. The shielding part is located at the cavity and held by the holding member provided to the cavity.

17 Claims, 17 Drawing Sheets

(56) References Cited

U.S. PATENT DOCUMENTS

| | | | | |
|---|---|---|---|---|
| 11,721,922 | B2 * | 8/2023 | Mamuro ............ | H01R 13/6471 439/607.05 |
| 11,901,658 | B2 * | 2/2024 | Jodo .................. | H01R 13/6473 |
| 12,218,451 | B2 * | 2/2025 | Mamuro ............ | H01R 13/6581 |
| 2017/0033479 | A1 * | 2/2017 | Ozeki .................. | H01R 13/639 |
| 2018/0198241 | A1 * | 7/2018 | Ooi .................... | H01R 13/6597 |
| 2019/0348780 | A1 * | 11/2019 | Kitazawa ........... | H01R 13/6587 |
| 2019/0393634 | A1 | 12/2019 | Kao et al. | |
| 2021/0218200 | A1 * | 7/2021 | Shimomura ....... | H01R 13/6594 |
| 2021/0226386 | A1 * | 7/2021 | Ma ........................ | H01R 13/652 |
| 2023/0246359 | A1 * | 8/2023 | Suzuki ................. | H01R 12/716 439/74 |
| 2023/0335930 | A1 * | 10/2023 | Morita ................. | H01R 13/405 |
| 2024/0039215 | A1 * | 2/2024 | Oh ..................... | H01R 13/6588 |

FOREIGN PATENT DOCUMENTS

| | | | |
|---|---|---|---|
| JP | 2011-003393 | A | 1/2011 |
| JP | 2021-089872 | A | 6/2021 |
| JP | 6924222 | B2 | 8/2021 |
| JP | 2021-140953 | A | 9/2021 |

* cited by examiner

ELECTRICAL CONNECTOR AND ELECTRICAL CONNECTOR SET INCLUDING THE SAME

CROSS-REFERENCE TO RELATED APPLICATION

This application claims benefit of priority to Japanese Patent Application No. 2022-001185, filed Jan. 6, 2022, the entire content of which is incorporated herein by reference.

BACKGROUND

Technical Field

The present disclosure relates to an electrical connector and an electrical connector set including the electrical connector.

Background Art

For example, Japanese Unexamined Patent Application Publication No. 2011-3393 discloses a connector in which a ground contact is disposed at a central part in alignment of a plurality of signal contacts. The ground contact in Japanese Unexamined Patent Application Publication No. 2011-3393 is in a P-shape and has a cavity extending therethrough at the center. Japanese Patent No. 6924222 discloses a connector which adjusts an impedance by a cavity provided to a terminal. The cavity of the terminal in Japanese Patent No. 6924222 is formed between an end part and a contact part of the terminal.

SUMMARY

When a distance between adjacent signal terminals is increased in order to prevent interference of signals between the adjacent signal terminals, there is a problem in that a connector becomes larger in size. Further, also when a U-shaped ground terminal is disposed between the adjacent signal terminals, there is a problem in that sufficient isolation characteristics cannot be obtained due to a cavity formed at the U-shaped ground terminal. Further, when the shape of the signal terminal and the shape of the ground terminal are different in side view, the adjacent signal terminals are opposed to each other, and thus, there is a problem in that sufficient isolation characteristics cannot be obtained.

In this respect, the present disclosure provides an electrical connector and an electrical connector set including the electrical connector, which can obtain sufficient isolation characteristics without the connector being increased in size.

To solve the above-described problems, an electrical connector according to an aspect of the present disclosure includes a holding member that is electrically insulating, and a signal terminal and a male ground terminal held by the holding member. The male ground terminal is disposed next to the signal terminal. The male ground terminal includes a frame projecting in side view, and a cavity formed inside the frame. The male ground terminal includes a shielding part that is conductive and configured to electromagnetically shield the cavity. The shielding part is located at the cavity and held by the holding member provided to the cavity.

According to the present disclosure, the cavity formed at the frame of the male ground terminal is electromagnetically shielded by the shielding part held by the holding member.

Therefore, sufficient isolation characteristics can be obtained without the connector being increased in size.

DETAILED DESCRIPTION

Hereinafter, embodiments of an electrical connector 20 and an electrical connector set 1 including the electrical connector 20 according to the present disclosure are described with reference to the drawings. In each of the drawings, an X axis, a Y axis, and a Z axis which are orthogonal to each other are illustrated for convenience. Herein, a longitudinal direction, a transverse direction, and a height direction of a male holding member 21 of the male-type electrical connector 20 are respectively defined as an X-axis direction, a Y-axis direction, and a Z-axis direction.

Figure 1:
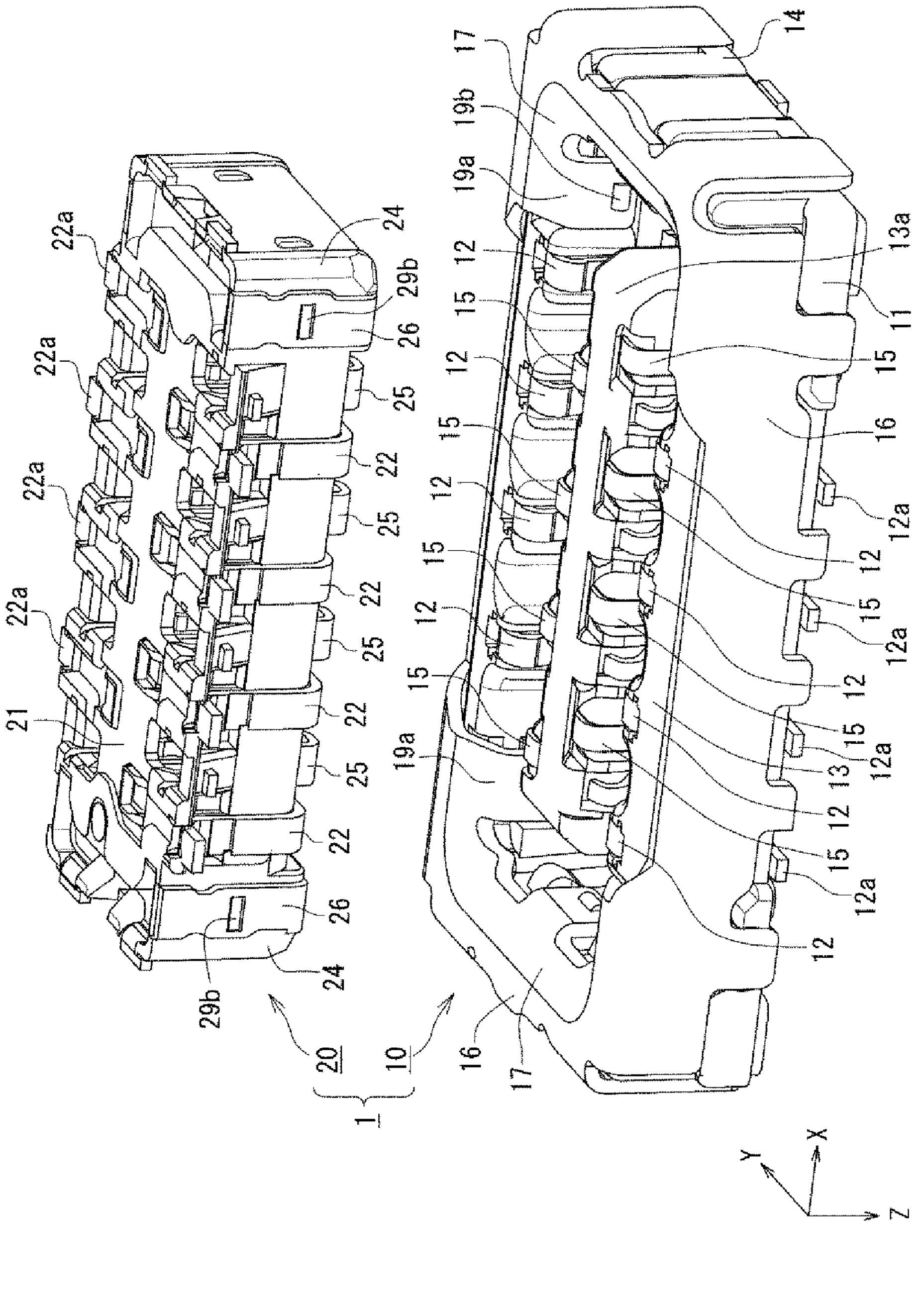
FIG. 1 is a perspective view of an electrical connector set according to one embodiment.
Figure 2:
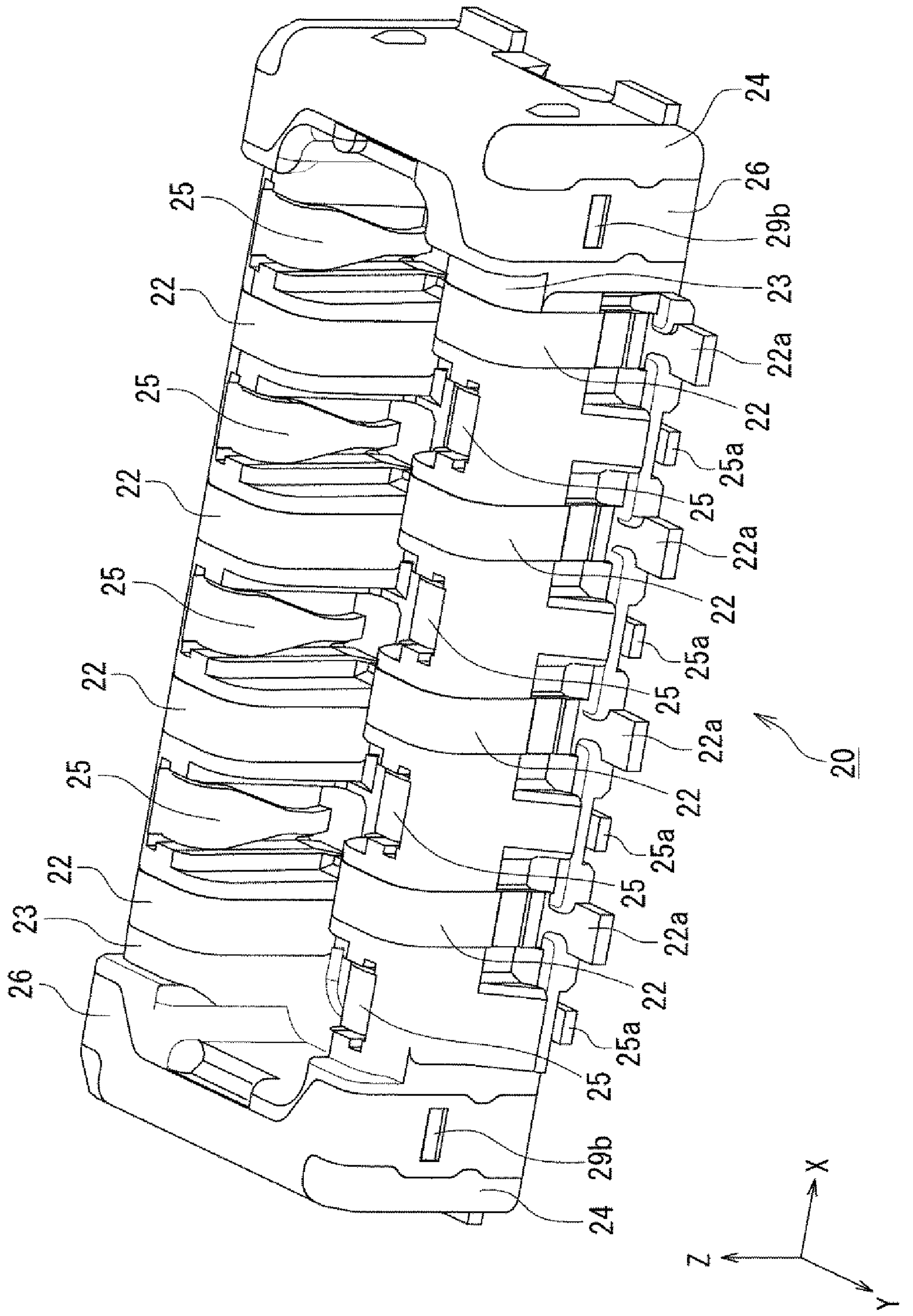
FIG. 2 is a perspective view of a male-type electrical connector constituting the electrical connector set illustrated in FIG. 1.
Figure 3:
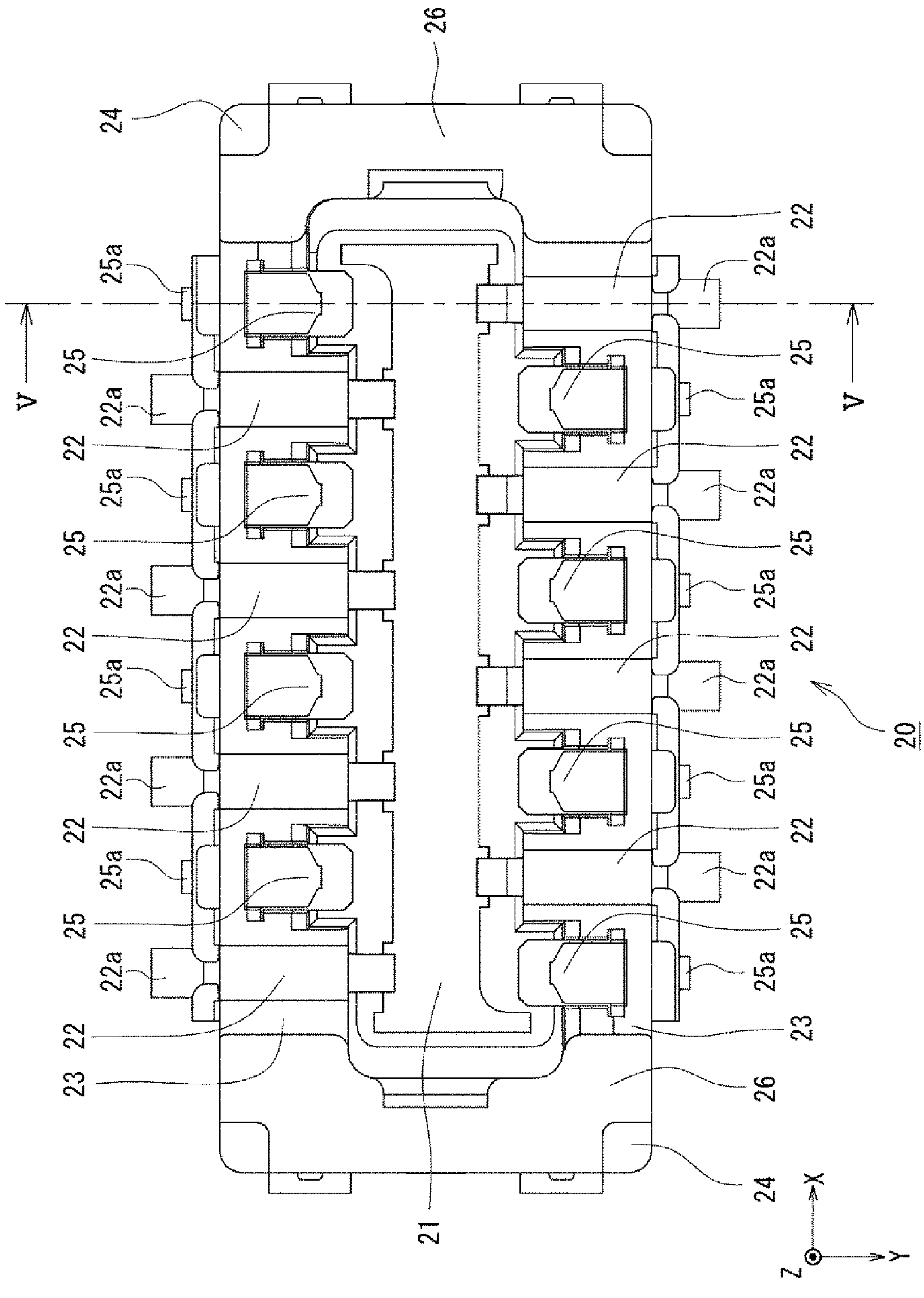
FIG. 3 is a plan view of the male-type electrical connector illustrated in FIG. 2.
Figure 4:
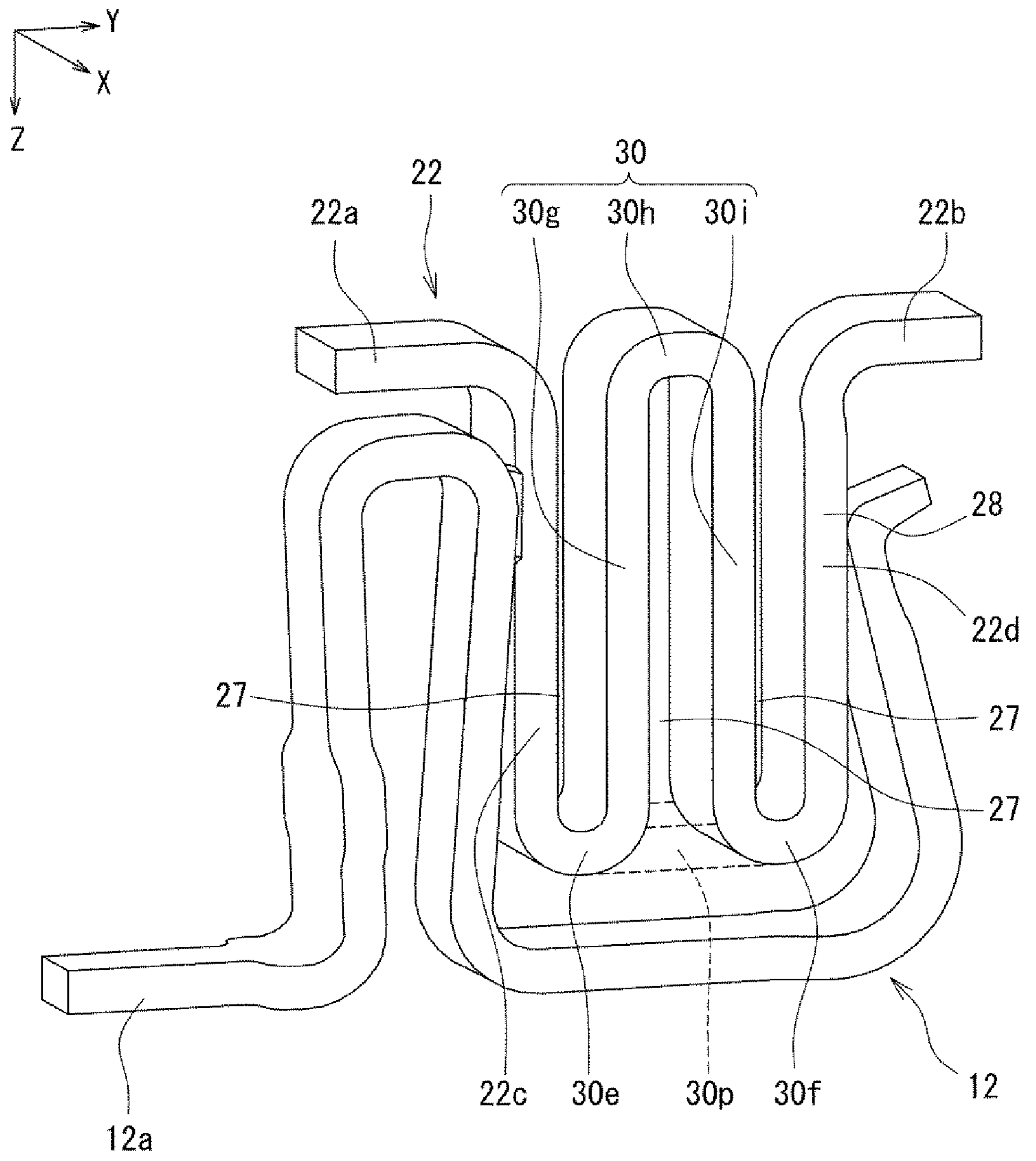
FIG. 4 is a perspective view illustrating engagement between a male ground terminal according to Embodiment 1 of the male-type electrical connector illustrated in FIG. 2 and a female ground terminal.
Figure 5:
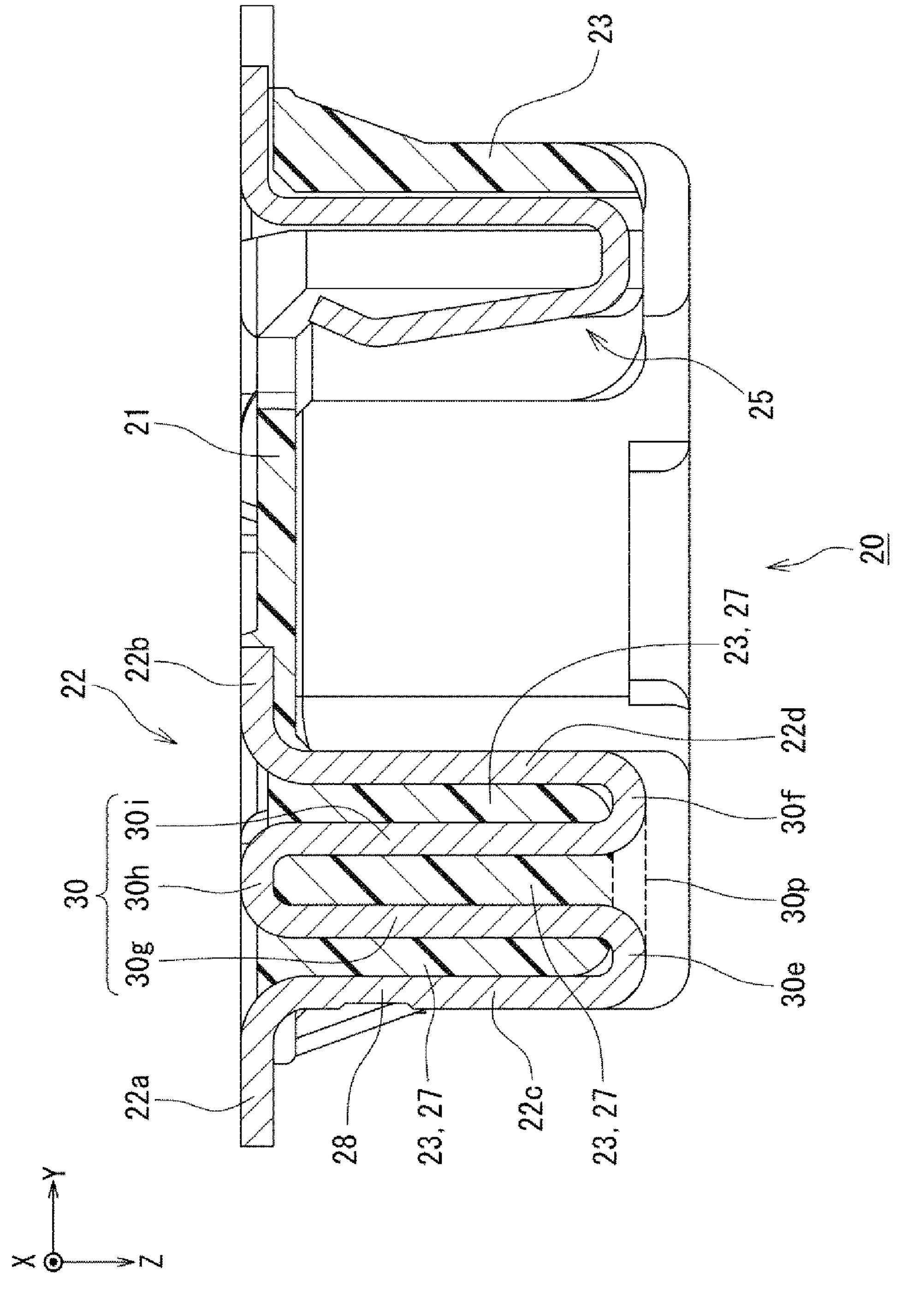
FIG. 5 is a sectional view of the male-type electrical connector illustrated in FIG. 3 taken along line V-V.

FIG. 1 is a perspective view of the electrical connector set 1 according to one embodiment. FIG. 2 is a perspective view of the male-type electrical connector 20 constituting the electrical connector set 1 illustrated in FIG. 1. FIG. 3 is a plan view of the male-type electrical connector 20 illustrated in FIG. 2. FIG. 4 is a perspective view of a male ground terminal 22 of the male-type electrical connector 20 illustrated in FIG. 2, engaging with a female ground terminal 12, according to Embodiment 1. FIG. 5 is a sectional view of the male-type electrical connector 20 illustrated in FIG. 3 taken along line V-V.

Electrical Connector Set

As illustrated in FIG. 1, the electrical connector set 1 includes a female-type electrical connector 10 and the male-type electrical connector 20. The electrical connector set 1 is configured such that by the male-type electrical connector 20 being moved in the height direction (insertion-and-removal direction) toward the female-type electrical connector 10 in a state where the male-type electrical connector 20 faces the female-type electrical connector 10, the female-type electrical connector 10 and the male-type electrical connector 20 are mated with each other. Note that, in this disclosure, the overall size of the male-type electrical connector 20 is smaller than the overall size of the female-type electrical connector 10 and the male-type electrical connector 20 is configured to be accommodated and fitted in the female-type electrical connector 10.

Female-Type Electrical Connector

A configuration of the female-type electrical connector 10 is described with reference to FIG. 1.

The female-type electrical connector 10 includes a female holding member (holding member) 11, a female ground terminal (inner terminal) 12, a female signal terminal (inner terminal) 15, and a female outer terminal (outer terminal) 16. As the female holding member 11, for example, an electrically-insulating resin such as liquid crystal polymer is used. The female holding member 11 has a rectangular shape extending in the longitudinal direction and the transverse direction in plan view. The female holding member 11 includes two female terminal side-holding parts (terminal holding parts) 13, and two female side-supporting parts 14. The two female terminal side-holding parts 13 extend in the longitudinal direction, and are mutually separated in the transverse direction. The two female side-supporting parts 14 are disposed at both end portions in the longitudinal direction so as to be mutually separated.

A female terminal middle-holding part 13*a* has a plurality of female signal terminal attachment parts each in a concave shape, and the female terminal side-holding part 13 has a plurality of female ground terminal attachment parts each in a concave shape. The female signal terminal 15 is held by being attached to the female signal terminal attachment part of the female terminal middle-holding part 13*a* (for example, through insert molding). The female ground terminal 12 is held by being attached to the female ground terminal attachment part of the female terminal side-holding part 13 (for example, through press fitting). The female signal terminal 15 is disposed next to the female ground terminal 12. For example, the female ground terminals 12 and the female signal terminals 15 are alternately disposed in the alignment direction of the terminals (in the longitudinal direction). The female ground terminal 12 corresponds one-to-one with the male ground terminal 22 (described later), and establishes electrical connection by being insertably and removably engaged with the corresponding male ground terminal 22. The female signal terminal 15 corresponds one-to-one with a male signal terminal 25 (described later), and establishes electrical connection by being engaged with the corresponding male signal terminal 25.

In the female-type electrical connector 10 illustrated in FIG. 1, the plurality of (for example, four) female signal terminals 15 arranged in a row in the alignment direction of the terminals (in the longitudinal direction) are disposed as each of a first row and a second row in the transverse direction so that the first and second rows are separated from each other in the transverse direction. In this configuration, many female signal terminals 15 can be disposed within a range of the female terminal side-holding part 13 having a limited size. Note that the arrangement of the plurality of female signal terminals 15 is not limited to be in two rows (for example, the first row and the second row), but may be in one row, or three or more rows. Further, the number of female signal terminals 15 in one row is not limited to four, but may be three or less, or five or more.

The female signal terminal 15 is a conductor connected to a signal potential, and is configured by a stick-like member having conductivity being bent. For example, phosphor bronze may be used as the female signal terminal 15. Phosphor bronze is elastically deformable material having conductivity. For example, gold plating or the like may be applied to a surface of the female signal terminal 15. The female signal terminal 15 includes a female signal mounted part (not illustrated) to be mounted on a land electrode of a circuit board (not illustrated). The female signal mounted part is formed at an inner portion in the transverse direction and a lower end in the height direction (insertion-and-removal direction).

The female ground terminal (inner terminal) 12 is provided in order to suppress interference of an electromagnetic wave between the two female signal terminals 15 adjacent to each other in the longitudinal direction (that is, in order to isolate the rows of the female signal terminals 15 from each other). The female ground terminal 12 is disposed between the two female signal terminals 15 adjacent to each other in the longitudinal direction, and serves as a female shielding terminal. For example, the female signal terminal 15 is held by being attached to the female signal terminal attachment part in a concave shape (for example, through insert molding). The female signal terminal 15 extends in the transverse direction.

The female ground terminal 12 is a conductor electrically connected to a ground potential, and is configured by a stick-like member having conductivity being bent. For example, phosphor bronze may be used as the female ground terminal 12. Phosphor bronze is elastically deformable material having conductivity. For example, gold plating or the like may be applied to a surface of the female ground terminal 12. The female ground terminal 12 includes a female ground mounted part (base mounted part) 12*a* to be mounted on a land electrode of a circuit board (not illustrated). The female ground mounted part 12*a* is formed at a side end in the longitudinal direction. Note that the female ground mounted part 12*a* may be formed at an inner portion in the transverse direction.

The female outer terminal 16 has a rectangular frame-like shape which is circumferentially closed so as to surround the plurality of female ground terminals 12 and the plurality of female signal terminals 15 when seen in the height direction (insertion-and-removal direction). In the female outer terminal 16 having the rectangular frame-like shape, a long side extends in the longitudinal direction and a short side extends in the transverse direction. Here, the term "circumferentially" is not necessarily limited to a polygonal circumference, but may be, for example, a circular circumference, an ellipse circumference, or a shape combining a polygonal circumference and a circular circumference.

The female outer terminal 16 is a conductor electrically connected to a ground potential. The female outer terminal 16 is electrically connected to the ground potential so that it blocks an electromagnetic wave from outside and unwanted radiation from the female signal terminal 15, and makes a space surrounded by the female outer terminal 16 be an electromagnetically shielded space. That is, the female outer terminal 16 is a member which surrounds the female signal terminal 15 in order to electromagnetically shield the female signal terminal 15. For example, phosphor bronze may be used as the female outer terminal 16. Phosphor bronze is elastically deformable material having conductivity. The female outer terminal 16 is formed through bending, for example.

The female side-supporting part 14 of the female holding member 11 supports a corresponding female outer side part of the female outer terminal 16 while the female outer side part being attached thereto. The female outer side part has a plurality of female outer mounted parts to be mounted on a ground electrode of a circuit board (not illustrated). The female outer mounted part is formed at a lower end in the height direction (insertion-and-removal direction).

The female outer terminal 16 includes two female outer side parts, two female outer extending parts, two guides 17, an attachment cavity, and a female contact wall part 19*a*. The female outer side parts are respectively provided to a first side portion and a second side portion in the longitudinal direction. The female outer extending parts each extends in the longitudinal direction to connect the two female outer side parts.

On an inner surface of the female contact wall part 19*a*, a female contact latching part 19*b* in a shape inwardly projecting in the transverse direction is formed. In the mated state of the female-type electrical connector 10 and the male-type electrical connector 20, the female contact latching part 19*b* in the convex shape in the female outer terminal 16 latches with a male contact latching part 29*b* in a concave shape in a male outer terminal 26 (described later). In this configuration, secure mating can be achieved without affecting the female ground terminal 12, the female signal terminal 15, or the like. Note that the female contact latching part 19*b* serves as a contact part which electrically connects the female outer terminal 16 and the male outer terminal 26.

The female outer side part has a substantially U-shape when seen in the height direction (insertion-and-removal direction). The guide 17 provided to the female outer side part has a substantially U-shape when seen in the height direction (insertion-and-removal direction), and has a shape downwardly inclined from an outer side portion to an inner side portion. The guide 17 is used as a guide which securely guides the male outer terminal 26 to the attachment cavity when the male-type electrical connector 20 is inserted into the female-type electrical connector 10 in the height direction (insertion-and-removal direction). The attachment cavity is a cavity formed inside the guide 17, and has a substantially rectangular shape when seen in the height direction (insertion-and-removal direction).

Male-type Electrical Connector

A configuration of the male-type electrical connector (electrical connector) 20 is described with reference to FIGS. 2 and 3.

As illustrated in FIG. 2, the male-type electrical connector 20 includes the male holding member (holding member) 21 (illustrated in FIGS. 1 and 3), the male ground terminal (inner terminal) 22, the male signal terminal (inner terminal, the signal terminal) 25, and the male outer terminal (outer terminal) 26. As the male holding member 21, for example, an electrically-insulating resin such as liquid crystal polymer is used. The male holding member 21 has a rectangular shape extending in the longitudinal direction and the transverse direction. The male holding member 21 includes two male terminal holding parts (terminal holding parts) 23, and two male side-supporting parts 24. The two male terminal holding parts 23 extend in the longitudinal direction, and are mutually separated in the transverse direction. The two male side-supporting parts 24 are disposed at both end portions of the male-type electrical connector 20 in the longitudinal direction so as to be mutually separated.

The male terminal holding part 23 of the male holding member 21 has a plurality of male signal terminal attachment parts each in a concave shape. The male signal terminal 25 is held by being attached to the male signal terminal attachment part (for example, through press fitting). The plurality of male ground terminals 22 are held by being attached to the male terminal holding part 23 of the male holding member 21 (for example, through insert molding). The male ground terminal 22 is disposed next to the male signal terminal 25. For example, the plurality of male ground terminals 22 and the plurality of male signal terminals 25 are alternately arranged in the alignment direction of the terminals (in the longitudinal direction). The male ground terminal 22 corresponds one-to-one with the above-described female ground terminal 12, and establishes electrical connection by being insertably and removably engaged with the corresponding female ground terminal 12 in the mated state of the electrical connector set 1. The male signal terminal 25 corresponds one-to-one with the above-described female signal terminal 15, and establishes electrical connection by being engaged with the corresponding female signal terminal 15 in the mated state of the electrical connector set 1.

In the male-type electrical connector 20 illustrated in FIG. 2, the plurality of (for example, four) male ground terminals 22 and male signal terminals 25 alternately arranged in the alignment direction of the terminals (in the longitudinal direction). The male ground terminals 22 and the male signal terminals 25 are disposed as each of a first row and a second row in the transverse direction so that the first and second rows are separated from each other in the transverse direction.

The male signal terminal 25 is a conductor connected to a signal potential, and is configured by a stick-like member having conductivity being bent. For example, phosphor bronze may be used as the male signal terminal 25. Phosphor bronze is elastically deformable material having conductivity. For example, gold plating or the like may be applied to a surface of the male signal terminal 25. The male signal terminal 25 includes a male signal mounted part 25*a* to be mounted on a land electrode of a circuit board (not illustrated). The male signal mounted part 25*a* is formed at a side end in the transverse direction and a lower end in the height direction (insertion-and-removal direction). For example, the male signal terminal 25 is held by being attached to the male signal terminal attachment part in a concave shape (for example, through press fitting). The male signal terminal 25 extends in the transverse direction.

The male ground terminal 22 is provided in order to suppress interference of an electromagnetic wave between two male signal terminals 25 adjacent to each other in the alignment direction of the terminals (in the longitudinal direction) (that is, in order to isolate the rows of the male signal terminals 25 from each other). The male ground terminal 22 is disposed between the two male signal terminals 25 adjacent to each other in the alignment direction of the terminals (in the longitudinal direction), and serves as a male shielding terminal. For example, the male ground terminal 22 is held through insert molding with the male terminal holding part 23. The male ground terminal 22 extends in the transverse direction.

The male ground terminal 22 is a conductor electrically connected to a ground potential, and is made by a stick-like member having conductivity being bent or a plate-like member having conductivity being punched. For example, phosphor bronze may be used as the male ground terminal 22. Phosphor bronze is elastically deformable material having conductivity. For example, gold plating or the like may be applied to a surface of the male ground terminal 22. The male ground terminal 22 includes a first male ground mounted part 22*a* and a second male ground mounted part 22*b* to be mounted on ground electrodes of a circuit board (not illustrated). The first male ground mounted part 22*a* and the second male ground mounted part 22*b* are each formed at a side end in the transverse direction and a lower end in the height direction (insertion-and-removal direction).

The two male outer terminals 26 are disposed to be separated from each other at both end portions in the longitudinal direction when seen in the height direction (insertion-and-removal direction). The male side-supporting part 24 of the male holding member 21 supports the corresponding male outer terminal 26 while the male outer terminal 26 being attached thereto. The male outer terminal 26 has a plurality of male outer mounted parts to be mounted on a ground electrode of a circuit board (not illustrated). The male outer mounted part is formed at a lower end in the height direction (insertion-and-removal direction).

The male outer terminal 26 is a conductor electrically connected to a ground potential. The male outer terminal 26 is electrically connected to the ground potential so that it blocks an electromagnetic wave from outside and unwanted radiation from the male signal terminal 25, and makes a space surrounded by the male outer terminal 26 be an electromagnetically shielded space. That is, the male outer terminal 26 is a member which surrounds the male signal terminal 25 in order to electromagnetically shield the male signal terminal 25. For example, phosphor bronze may be used as the male outer terminal 26. Phosphor bronze is elastically deformable material having conductivity. The male outer terminal 26 is formed through bending, for example.

In the mated state of the female-type electrical connector 10 and the male-type electrical connector 20, the female contact latching part 19*b* in the convex shape in the female outer terminal 16 described above latches with the male contact latching part 29*b* in a concave shape in the male outer terminal 26. In this configuration, secure mating can be achieved without affecting the male ground terminal 22, the male signal terminal 25, or the like. Note that the male contact latching part 29*b* serves as a connection part which electrically connects the female outer terminal 16 and the male outer terminal 26.

Male Ground Terminal According to Embodiment 1

A configuration and operation of the male ground terminal 22 according to Embodiment 1 of the male-type electrical connector 20 are described with reference to FIGS. 4 and 5.

As illustrated in FIGS. 4 and 5, the male ground terminal 22 projects in a W-shape in side view. The male ground terminal 22 includes the first male ground mounted part 22*a*, the second male ground mounted part 22*b*, a first outer lengthwise extending part 22*c*, a second outer lengthwise extending part 22*d*, a first lateral contact part 30*e*, a second laterally connecting part 30*f*, a first inner lengthwise extending part 30*g*, a top part 30*h*, and a second inner lengthwise extending part 30*i*.

The first male ground mounted part 22*a* is a male ground mounted part located on the upper side and on a first side in FIG. 4. The second male ground mounted part 22*b* is a male ground mounted part located on the upper side and on a second side in FIG. 4, and is positioned on the opposite side from the first male ground mounted part 22*a* having the top part 30*h* therebetween. The first male ground mounted part 22*a* and the second male ground mounted part 22*b* extend in a lateral direction (transverse direction) orthogonal to the alignment direction of the male ground terminals 22.

The first outer lengthwise extending part 22*c* is positioned on the first side and extends in the lengthwise direction (height direction) while being connected to the first male ground mounted part 22*a*. The second outer lengthwise extending part 22*d* is positioned on the second side and extends in the lengthwise direction (height direction) while being connected to the second male ground mounted part 22*b*.

The first lateral contact part 30*e* connects the first outer lengthwise extending part 22*c* to the first inner lengthwise extending part 30*g*, and has a curved shape in a U-shape. The second laterally connecting part 30*f* connects the second outer lengthwise extending part 22*d* to the second inner lengthwise extending part 30*i*, and has a curved shape in a U-shape.

The first inner lengthwise extending part 30*g* is positioned on the first side and extends in the lengthwise direction (height direction), and is separated from the first outer lengthwise extending part 22*c* in the lateral direction (transverse direction) orthogonal to the alignment direction of the male ground terminals 22. The second inner lengthwise extending part 30*i* is positioned on the second side and extends in the lengthwise direction (height direction), and is separated from the second outer lengthwise extending part 22*d* in the lateral direction (transverse direction) orthogonal to the alignment direction of the male ground terminals 22. The first inner lengthwise extending part 30*g* and the second inner lengthwise extending part 30*i* are opposed to each other in the lateral direction (transverse direction) orthogonal to the alignment direction of the male ground terminals 22.

The top part 30*h* connects the first inner lengthwise extending part 30*g* to the second inner lengthwise extending part 30*i*, and has a curved shape in an inverse U-shape. By the top part 30*h*, the first inner lengthwise extending part 30*g* and the second inner lengthwise extending part 30*i* are separated from each other in the lateral direction (transverse direction) orthogonal to the alignment direction of the male ground terminals 22. The top part 30*h* is electrically connected to a ground electrode of a circuit board (not illustrated). Therefore, a ground potential of a projecting part 30 (described later) becomes lower, and isolation effect as a result of shielding by the projecting part 30 is improved.

Similarly to FIGS. 10 to 15 described later, the male ground terminal 22 according to the conventional technique includes a frame 28 projecting in a U-shape in side view, by the first outer lengthwise extending part 22*c*, the second outer lengthwise extending part 22*d*, and a laterally connecting part 22*f*. The male ground terminal 22 including the frame 28 projecting in the U-shape in side view has a cavity 27 in a rectangular shape at a part inside the frame 28.

On the other hand, the male ground terminal 22 according to Embodiment 1 illustrated in FIG. 4 includes the first outer lengthwise extending part 22*c*, the second outer lengthwise extending part 22*d*, the first lateral contact part 30*e*, and the second laterally connecting part 30*f*. In the male ground terminal 22, by an imaginary laterally connecting part 30*p* (indicated by a broken line in FIG. 4) imaginarily connecting the first lateral contact part 30*e* to the second laterally connecting part 30*f* being added, the frame 28 projecting in a U-shape in side view is imaginarily formed. The imaginary laterally connecting part 30*p* extends in the lateral direction (transverse direction) orthogonal to the alignment direction of the male ground terminals 22. Therefore, by the imaginary laterally connecting part 30*p* connecting, in the lateral direction (transverse direction) orthogonal to the alignment direction of the male ground terminals 22, the first lateral contact part 30*e* to the second laterally connecting part 30*f* according to Embodiment 1 being provisionally provided, the shape corresponding to the laterally connecting part 22*f* illustrated in FIGS. 10 to 15 is obtained, and the frame 28 projecting in the U-shape in side view can imaginarily be formed.

Then, the first lateral contact part 30*e*, the second laterally connecting part 30*f*, and the imaginary laterally connecting part 30*p* imaginarily constitute a bottom part of the frame 28. The first inner lengthwise extending part 30*g*, the second inner lengthwise extending part 30*i*, and the top part 30*h* described above constitute the projecting part 30 projecting from the bottom part of the frame 28 (that is, from the laterally connecting part 22*f*) in a direction opposite from the projecting direction of the frame 28. The projecting part 30 projects in an inverse U-shape in side view, for example.

The male ground terminal 22 includes the frame 28 projecting in a U-shape in side view by the imaginary laterally connecting part 30*p* being provisionally provided, and it imaginarily includes the rectangular cavity 27 at the part inside the frame 28. Therefore, the projecting part 30 is positioned at the rectangular cavity 27.

Since the projecting part 30 is a part of the male ground terminal 22, the projecting part 30 also has conductivity. Therefore, the projecting part 30 serves as a shielding part which electromagnetically shields the cavity 27. As a result, since the shielding part 30 is formed as a part of the frame 28, making the shielding part 30 becomes easier.

The male ground terminal 22 is held by the electrically-insulating male terminal holding part 23 (male holding member 21) being provided to the cavity 27 of the male ground terminal 22. Furthermore, the projecting part 30 which serves as the shielding part is also held by the electrically-insulating male terminal holding part 23 (male holding member 21).

Therefore, since the cavity 27 formed at the frame 28 of the male ground terminal 22 is electromagnetically shielded by the projecting part (shielding part) 30 held by the holding member 21, sufficient isolation characteristics can be obtained without the connector being increased in size.

Male Ground Terminal According to Embodiment 2

Figure 6:
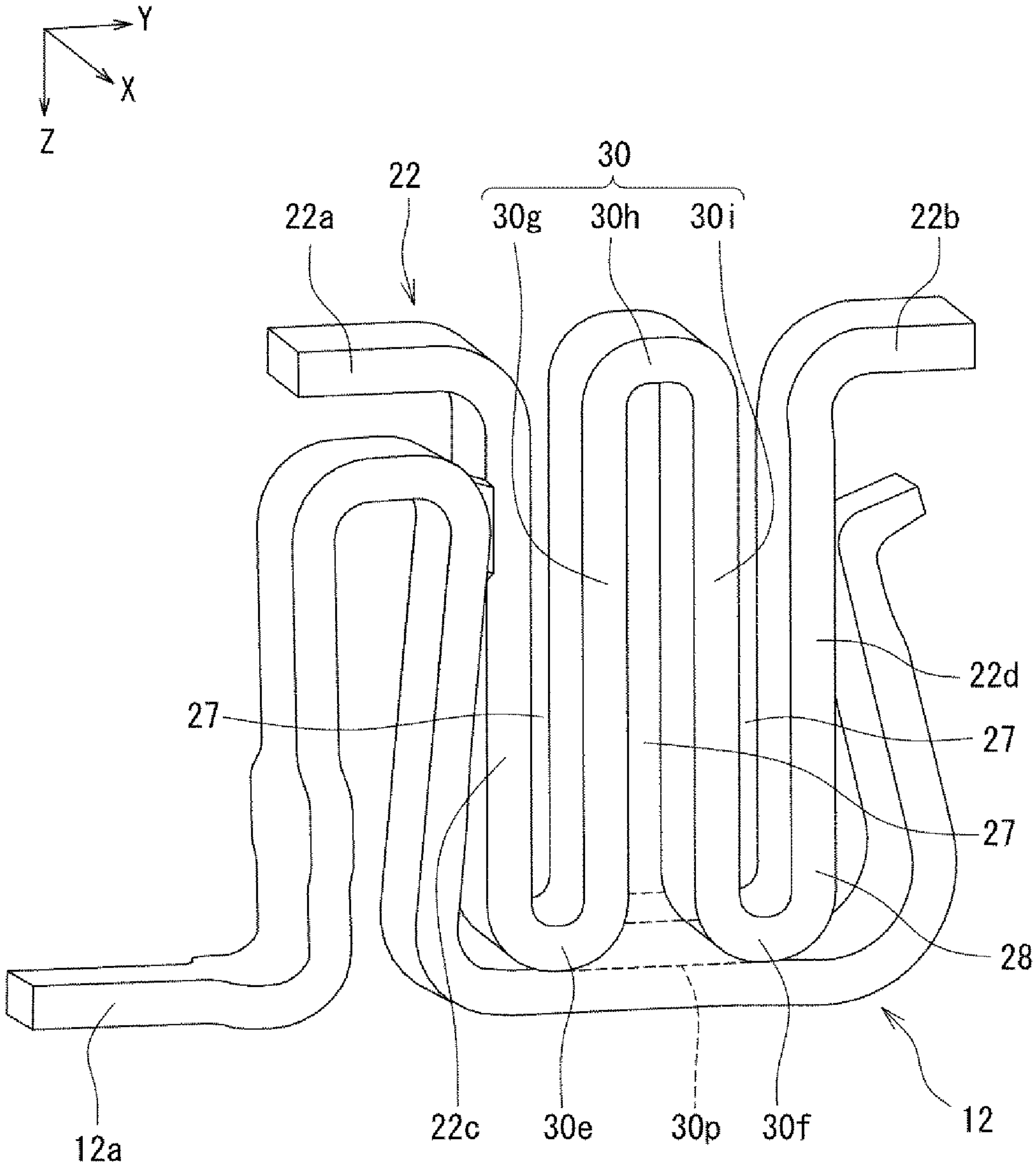
FIG. 6 is a perspective view illustrating engagement of a male ground terminal according to Embodiment 2 and a female ground terminal.

A configuration and operation of the male ground terminal 22 according to Embodiment 2 of the male-type electrical connector 20 are described with reference to FIG. 6. FIG. 6 is a perspective view illustrating engagement of the male ground terminal 22 according to Embodiment 2 and the female ground terminal 12.

Note that FIG. 6 illustrates engagement between the male ground terminal 22 and the female ground terminal 12, and illustration of the electrically-insulating male terminal holding part 23 (male holding member 21) is omitted. However, similarly to FIG. 5 related to Embodiment 1, the projecting part (also serving as the shielding part) 30 of the male ground terminal 22 according to Embodiment 2 is also held by the electrically-insulating male terminal holding part 23 (male holding member 21).

The male ground terminal 22 according to Embodiment 2 is described below, focusing on differences from the male ground terminal 22 according to Embodiment 1 illustrated in FIG. 4.

As illustrated in FIG. 6, the male ground terminal 22 projects in a W-shape in side view. The male ground terminal 22 includes the first male ground mounted part 22*a*, the second male ground mounted part 22*b*, the first outer lengthwise extending part 22*c*, the second outer lengthwise extending part 22*d*, the first lateral contact part 30*e*, the second laterally connecting part 30*f*, the first inner lengthwise extending part 30*g*, the top part 30*h*, and the second inner lengthwise extending part 30*i*.

In the male ground terminal 22 according to Embodiment 2 illustrated in FIG. 6, the first lateral contact part 30*e* and the second laterally connecting part 30*f* which serve as the bottom part of the frame 28 are configured to contact a laterally connecting part of the female ground terminal 12. Therefore, space formed between the male ground terminal 22 and the female ground terminal 12 in the engaged state is reduced, and electromagnetic shielding effect in the engaged state is improved.

Moreover, similarly to Embodiment 1, since the cavity 27 formed at the frame 28 of the male ground terminal 22 is electromagnetically shielded by the projecting part (shielding part) 30 held by the holding member 21, sufficient isolation characteristics can be obtained without the connector being increased in size.

Male Ground Terminal According to Embodiment 3

Figure 7:
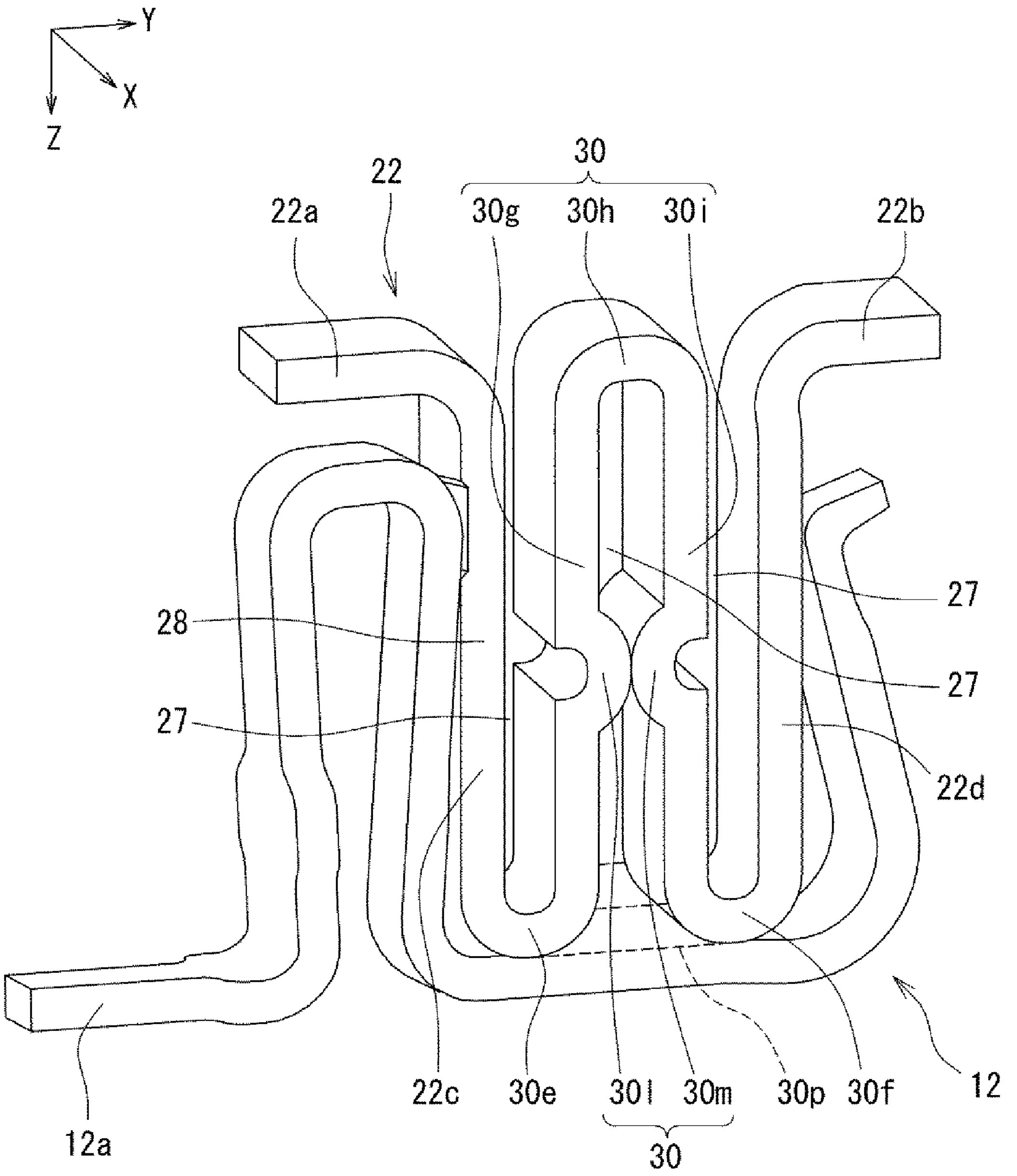
FIG. 7 is a perspective view illustrating engagement of a male ground terminal according to Embodiment 3 and a female ground terminal.

A configuration and operation of the male ground terminal 22 according to Embodiment 3 of the male-type electrical connector 20 are described with reference to FIG. 7. FIG. 7 is a perspective view illustrating engagement of the male ground terminal 22 according to Embodiment 3 and the female ground terminal 12.

The male ground terminal 22 according to Embodiment 3 is described below, focusing on differences from the male ground terminal 22 according to Embodiment 2 illustrated in FIG. 6.

As illustrated in FIG. 7, in the male ground terminal 22, the first inner lengthwise extending part 30*g* includes a first inwardly protruding part 301 protruding toward the second inner lengthwise extending part 30*i*, and the second inner lengthwise extending part 30*i* includes a second inwardly protruding part 30*m* protruding toward the first inner lengthwise extending part 30*g*. Each of the first inwardly protruding part 301 and the second inwardly protruding part 30*m* has, for example, a half-cylindrical shape.

The first inwardly protruding part 301 is positioned at a central portion of the first inner lengthwise extending part 30*g* in the lengthwise direction (height direction). The second inwardly protruding part 30*m* is positioned at a central portion of the second inner lengthwise extending part 30*i* in the lengthwise direction (height direction). The first inwardly protruding part 301 and the second inwardly protruding part 30*m* are opposed to and in contact with each other. Therefore, the ground potential of the projecting part 30 becomes lower, and isolation effect as a result of shielding by the projecting part 30 is improved.

Moreover, similarly to Embodiment 2, since the cavity 27 formed at the frame 28 of the male ground terminal 22 is electromagnetically shielded by the projecting part (shielding part) 30 held by the holding member 21, sufficient isolation characteristics can be obtained without the connector being increased in size.

Male Ground Terminal According to Embodiment 4

Figure 8:
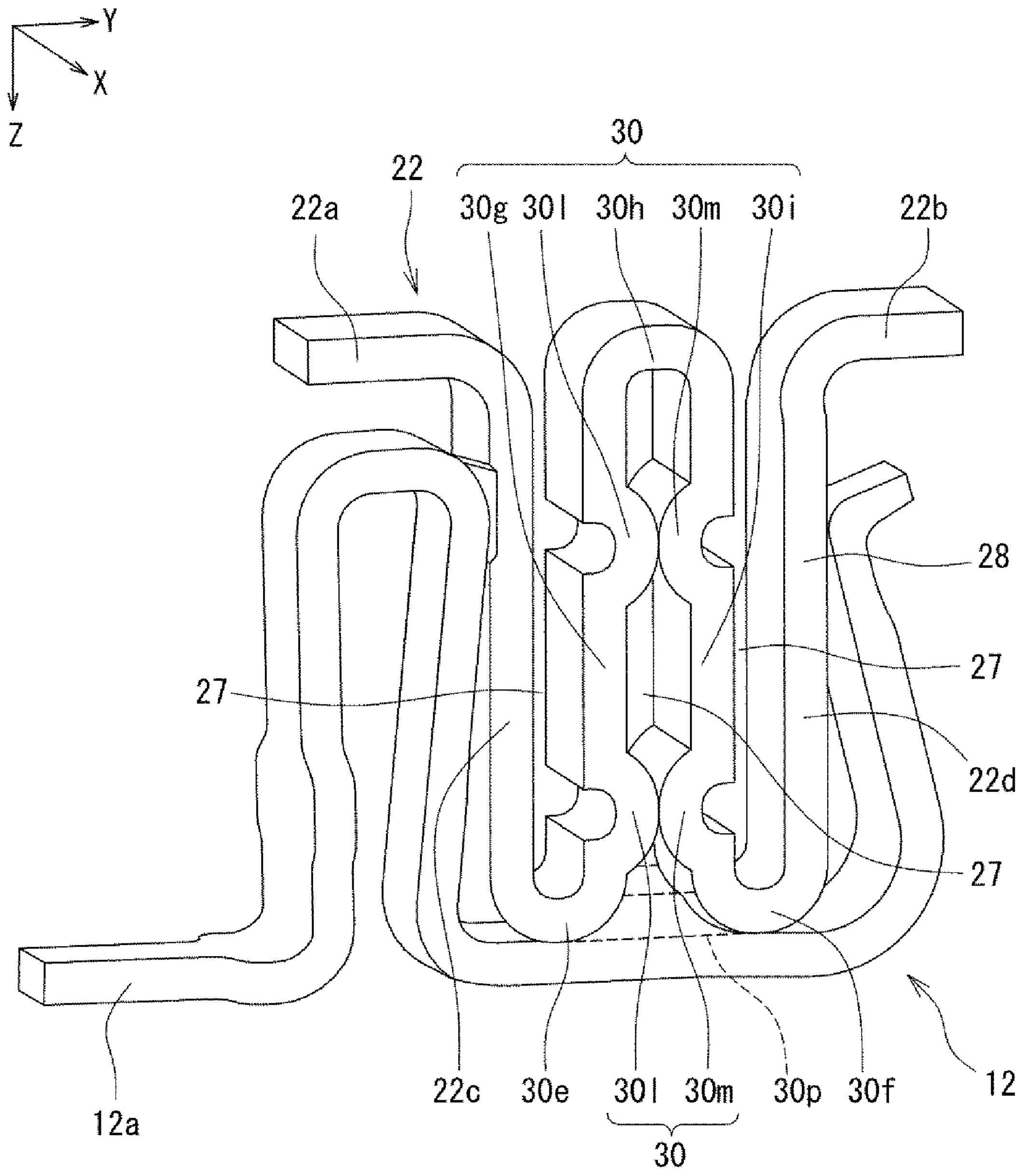
FIG. 8 is a perspective view illustrating engagement of a male ground terminal according to Embodiment 4 and a female ground terminal.

A configuration and operation of the male ground terminal 22 according to Embodiment 4 of the male-type electrical connector 20 are described with reference to FIG. 8. FIG. 8 is a perspective view illustrating engagement of the male ground terminal 22 according to Embodiment 4 and the female ground terminal 12.

The male ground terminal 22 according to Embodiment 4 is described below, focusing on differences from the male ground terminal 22 according to Embodiment 3 illustrated in FIG. 7.

As illustrated in FIG. 8, in the male ground terminal 22, the first inner lengthwise extending part 30*g* includes two first inwardly protruding parts 301 protruding toward the second inner lengthwise extending part 30*i*, and the second inner lengthwise extending part 30*i* includes two second inwardly protruding parts 30*m* protruding toward the first inner lengthwise extending part 30*g*.

The two first inwardly protruding parts 301 are provided to the first inner lengthwise extending part 30*g* to be separated from each other in the lengthwise direction (height direction). The two second inwardly protruding parts 30*m* are provided to the second inner lengthwise extending part 30*i* to be separated from each other in the lengthwise direction (height direction). The two first inwardly protruding parts 301 separated from each other in the lengthwise direction (height direction) are opposed to and in contact with the second inwardly protruding parts 30*m* separated from each other in the lengthwise direction (height direction). Therefore, the ground potential of the projecting part 30 becomes lower, and isolation effect as a result of shielding by the projecting part 30 is improved.

Moreover, similarly to Embodiment 3, since the cavity 27 formed at the frame 28 of the male ground terminal 22 is electromagnetically shielded by the projecting part (shielding part) 30 held by the holding member 21, sufficient isolation characteristics can be obtained without the connector being increased in size.

Male Ground Terminal According to Embodiment 5

Figure 9:
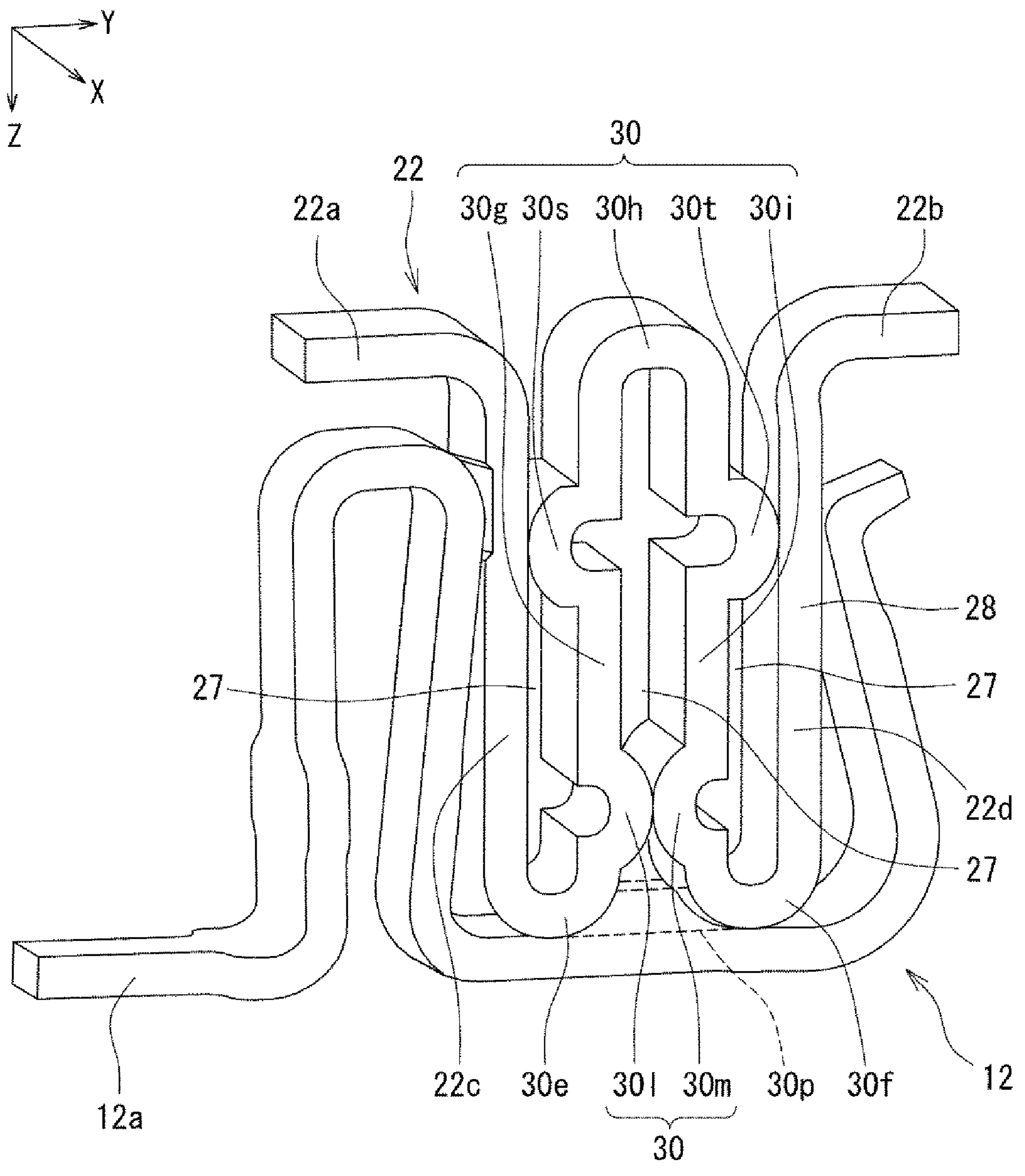
FIG. 9 is a perspective view illustrating engagement of a male ground terminal according to Embodiment 5 and a female ground terminal.

A configuration and operation of the male ground terminal 22 according to Embodiment 5 of the male-type electrical connector 20 are described with reference to FIG. 9. FIG. 9 is a perspective view illustrating engagement of the male ground terminal 22 according to Embodiment 5 and the female ground terminal 12.

The male ground terminal 22 according to Embodiment 5 is described below, focusing on differences from the male ground terminal 22 according to Embodiment 4 illustrated in FIG. 8.

As illustrated in FIG. 8, in the male ground terminal 22, the first inner lengthwise extending part 30*g* includes the first inwardly protruding part 301 protruding toward the second inner lengthwise extending part 30*i* and a first outwardly protruding part 30*s* protruding toward the first outer lengthwise extending part 22*c*. Moreover, the second inner lengthwise extending part 30*i* includes the second inwardly protruding part 30*m* protruding toward the first inner lengthwise extending part 30*g* and a second outwardly protruding part 30*t* protruding toward the second outer lengthwise extending part 22*d*.

The first inwardly protruding part 301 and the first outwardly protruding part 30*s* are provided to the first inner lengthwise extending part 30*g* to be separated from each other in the lengthwise direction (height direction). For example, the first inwardly protruding part 301 is positioned on the side of the first lateral contact part 30*e*, and the first outwardly protruding part 30*s* is positioned on the side of the top part 30*h*. The second inwardly protruding part 30*m* and the second outwardly protruding part 30*t* are provided to the second inner lengthwise extending part 30*i* to be separated from each other in the lengthwise direction (height direction). For example, the second inwardly protruding part 30*m* is positioned on the side of the second laterally connecting part 30*f*, and the second outwardly protruding part 30*t* is positioned on the side of the top part 30*h*. The first inwardly protruding part 301 and the second inwardly protruding part 30*m* are opposed to and in contact with each other. The first outwardly protruding part 30*s* is opposed to and in contact with the first outer lengthwise extending part 22*c* of the frame 28. The second outwardly protruding part 30*t* is opposed to and in contact with the second outer lengthwise extending part 22*d* of the frame 28. Therefore, the ground potential of the projecting part 30 becomes lower, and isolation effect as a result of shielding by the projecting part 30 is improved.

Moreover, similarly to Embodiment 4, since the cavity 27 formed at the frame 28 of the male ground terminal 22 is electromagnetically shielded by the projecting part (shielding part) 30 held by the holding member 21, sufficient isolation characteristics can be obtained without the connector being increased in size.

Male Ground Terminal According to Embodiment 6

Figure 10:
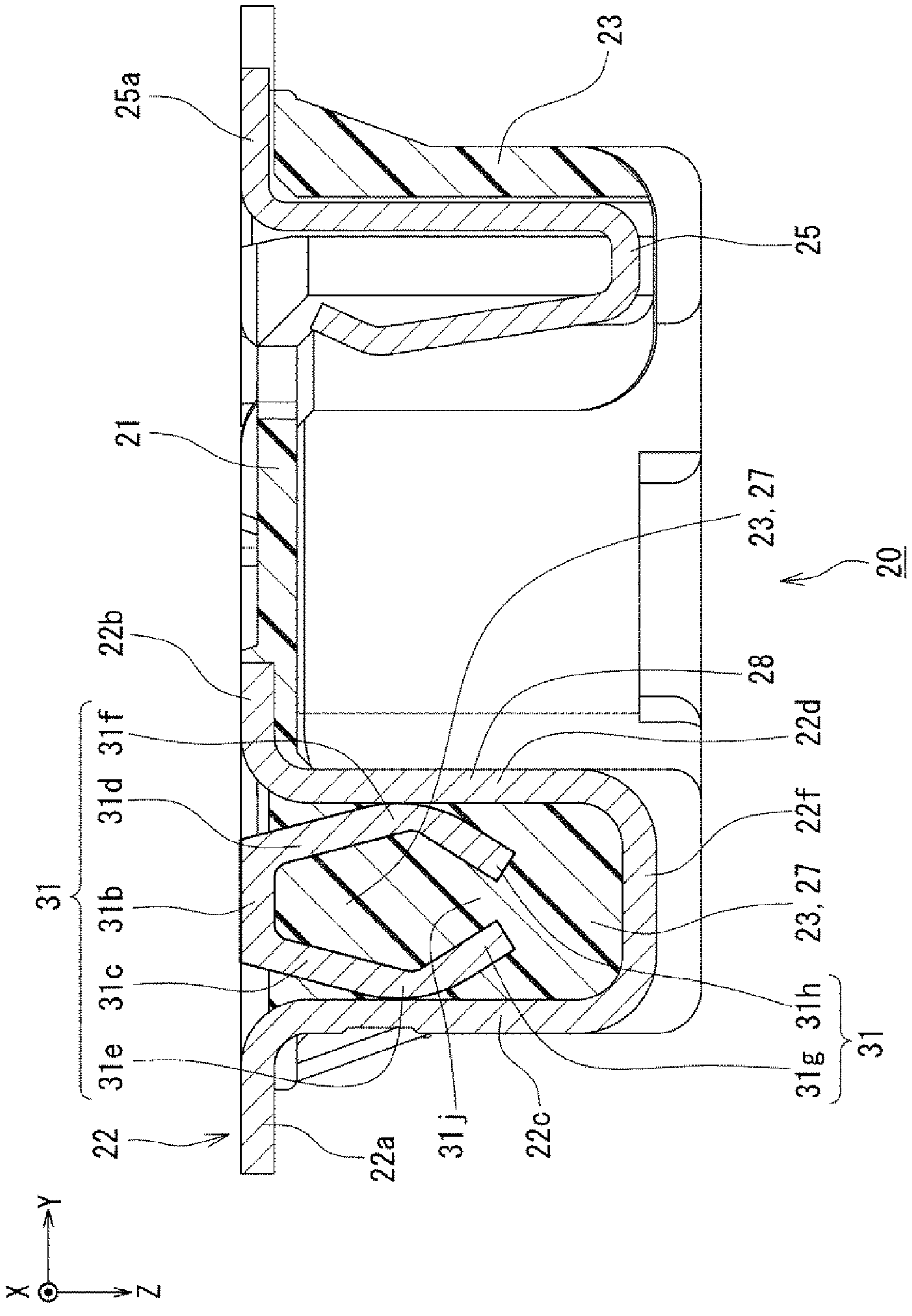
FIG. 10 is a sectional view of a male-type electrical connector including a male ground terminal according to Embodiment 6.
Figure 11:
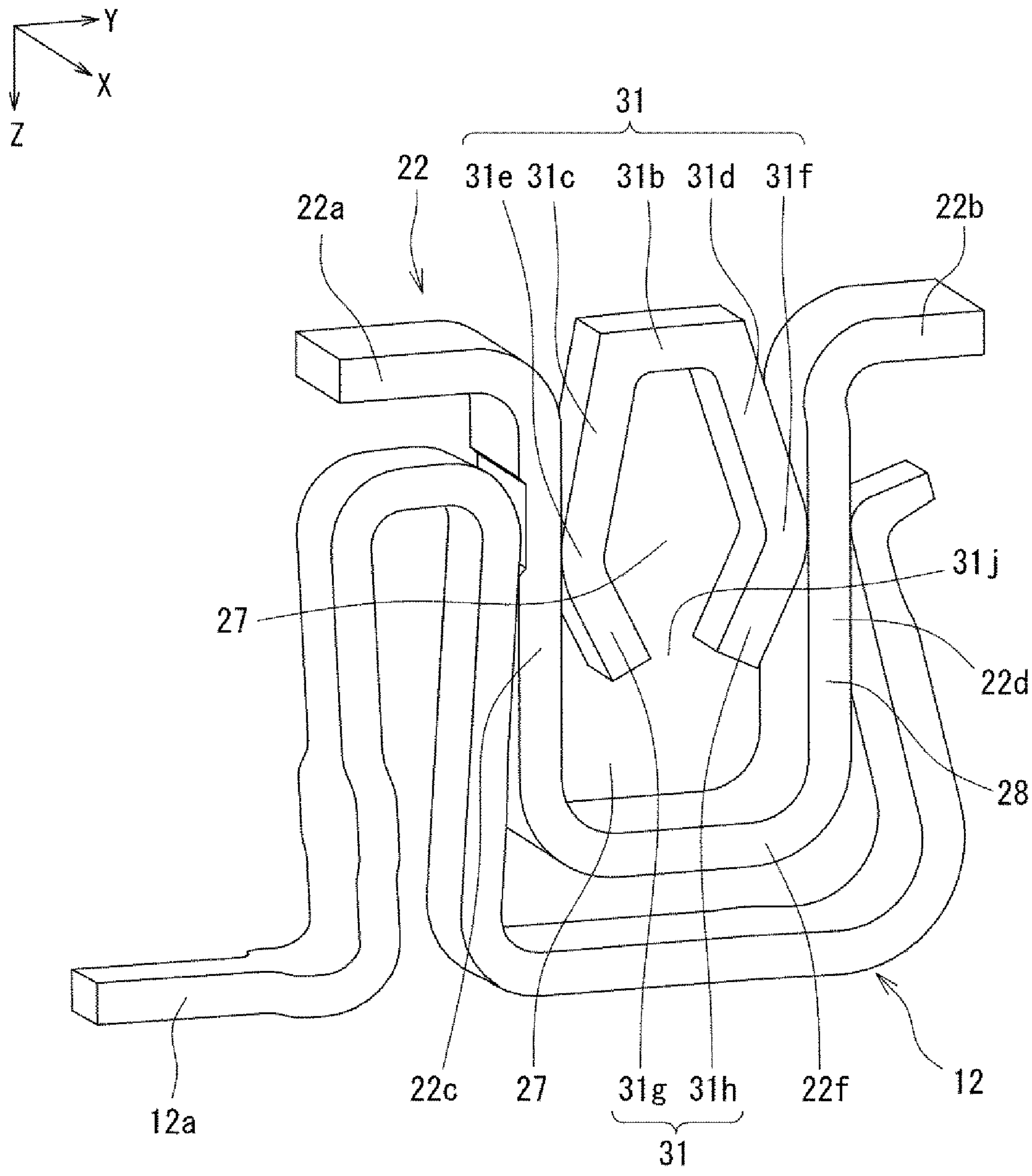
FIG. 11 is a perspective view illustrating engagement of the male ground terminal according to Embodiment 6 and a female ground terminal.

A configuration and operation of the male ground terminal 22 according to Embodiment 6 of the male-type electrical connector 20 are described with reference to FIGS. 10 and 11. FIG. 10 is a sectional view of the male-type electrical connector 20 including the male ground terminal 22 according to Embodiment 6. FIG. 11 is a perspective view illustrating engagement of the male ground terminal 22 according to Embodiment 6 and the female ground terminal 12.

The male ground terminal 22 according to Embodiment 6 is described below, focusing on differences from the male ground terminal 22 according to Embodiment 1 illustrated in FIGS. 4 and 5.

As illustrated in FIGS. 10 and 11, the male ground terminal 22 includes the frame 28 projecting in side view, and a conductive member 31. For example, the frame 28 projects in U-shape in side view. The frame 28 of the male ground terminal 22 includes the first male ground mounted part 22*a*, the second male ground mounted part 22*b*, the first outer lengthwise extending part 22*c*, the second outer lengthwise extending part 22*d*, and the laterally connecting part 22*f*. The laterally connecting part 22*f* extends in the lateral direction (transverse direction) orthogonal to the alignment direction of the male ground terminals 22.

The laterally connecting part 22*f* of the frame 28 forms the bottom part of the frame 28 projecting in a U-shape in side view. The male ground terminal 22 including the frame 28 projecting in a U-shape in side view has the cavity 27 in a rectangular shape at a part inside the frame 28. In other words, the frame 28 of the male ground terminal 22 includes the rectangular cavity 27. The frame 28 of the male ground terminal 22 is held by the electrically-insulating male terminal holding part 23 (male holding member 21) being provided to the cavity 27.

The conductive member 31 which is separate from the frame 28 is provided to the cavity 27 of the frame 28. The conductive member 31 serves as a conductive shielding part which electromagnetically shields the cavity 27. Similarly to the male ground terminal 22, the conductive member 31 is made by a stick-like member having conductivity being bent or a plate-like member having conductivity being punched. For example, phosphor bronze may be used as the conductive member 31. Phosphor bronze is elastically deformable material having conductivity. For example, gold plating or the like may be applied to a surface of the conductive member 31.

The conductive member 31 includes a top part 31*b*, a first upper arm part 31*c*, a second upper arm part 31*d*, a first corner 31*e*, a second corner 31*f*, a first lower arm part 31*g*, and a second lower arm part 31*h*.

The top part 31*b* is positioned between the first male ground mounted part 22*a* and the second male ground mounted part 22*b* on the upper side in FIG. 10. The top part 31*b* extends in the lateral direction (transverse direction) orthogonal to the alignment direction of the male ground terminals 22. The top part 31*b* is electrically connected to a ground potential. Therefore, a ground potential of the conductive member 31 becomes lower, and isolation effect as a result of shielding by the conductive member 31 is improved.

The first upper arm part 31*c* is connected to the top part 31*b* while extending in the lengthwise direction (height direction) obliquely toward the first outer lengthwise extending part 22*c*. The second upper arm part 31*d* is connected to the top part 31*b* while extending in the lengthwise direction (height direction) obliquely toward the second outer lengthwise extending part 22*d*.

The first corner 31*e* has a curved shape connecting the first upper arm part 31*c* to the first lower arm part 31*g*. The second corner 31*f* has a curved shape connecting the second upper arm part 31*d* to the second lower arm part 31*h*.

The first lower arm part 31*g* extends in the lengthwise direction (height direction) obliquely to separate from the first outer lengthwise extending part 22*c*. The second lower arm part 31*h* extends in the lengthwise direction (height direction) obliquely to separate from the second outer lengthwise extending part 22*d*. A lower-end portion of the first lower arm part 31*g* and a lower-end portion of the second lower arm part 31*h* are separated from each other to form a gap 31*j*. By the gap 31*j* being provided, the conductive member 31 becomes elastically deformable. Therefore, since the conductive member 31 elastically contacts the frame 28, stable electrical connection can be achieved.

Moreover, the conductive member 31 includes five sides (the top part 31*b*, the first upper arm part 31*c*, the second upper arm part 31*d*, the first lower arm part 31*g*, and the second lower arm part 31*h*). The conductive member 31 becomes a hexagon when a bottom part 31*i* corresponding to the gap 31*j* is imaginarily added, and thus, it can be deemed to have a discontinuous polygonal shape where one side is omitted.

When the first corner 31*e* and the second corner 31*f* are gripped, the conductive member 31 elastically deforms such that the first lower arm part 31*g* and the second lower arm part 31*h* become closer to each other. When the conductive member 31 is attached between the first outer lengthwise extending part 22*c* and the second outer lengthwise extending part 22*d* in this state, the conductive member 31 is elastically held between the first outer lengthwise extending part 22*c* and the second outer lengthwise extending part 22*d*. At this time, the first corner 31*e* contacts the first outer lengthwise extending part 22*c* and is electrically connected thereto, and the second corner 31*f* contacts the second outer lengthwise extending part 22*d* and is electrically connected thereto. In other words, the conductive member 31 contacts the inner surface of the frame 28 and is electrically connected thereto. Therefore, the ground potential of the conductive member 31 becomes lower, and isolation effect as a result of shielding by the conductive member 31 is improved.

As described above, the cavity 27 is provided with the electrically-insulating male terminal holding part 23 (male holding member 21). The conductive member 31 is provided to the cavity 27 in various methods. For example, an insertion hole which allows the conductive member 31 to contact the first outer lengthwise extending part 22*c* and the second outer lengthwise extending part 22*d* of the frame 28 by the conductive member 31 being inserted therein may be provided to the male terminal holding part 23 (male holding member 21) in advance. Then, by the conductive member 31 being inserted in the insertion hole, the conductive member 31 is held by the male terminal holding part 23 (male holding member 21). Further, by the conductive member 31 being insert-molded while being fixed to the frame 28 in advance, the conductive member 31 is held by the male terminal holding part 23 (male holding member 21). Note that the conductive member 31 is fixed to the frame 28 through soldering, welding, or the like.

Therefore, since the cavity 27 formed at the frame 28 of the male ground terminal 22 is electromagnetically shielded by the conductive member (shielding part) 31 held by the holding member 21, sufficient isolation characteristics can be obtained without the connector being increased in size.

Male Ground Terminal According to Embodiment 7

Figure 12:
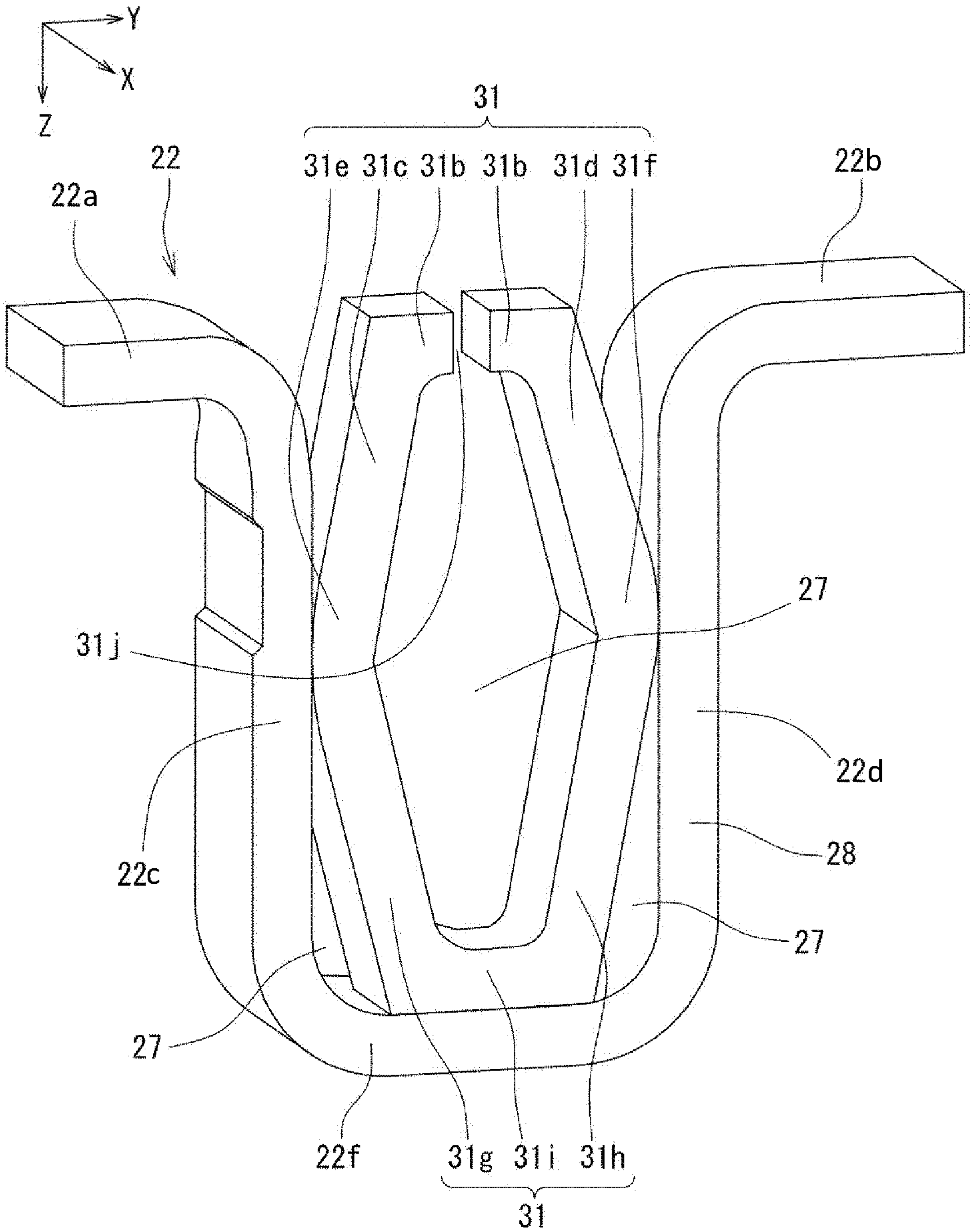
FIG. 12 is a perspective view of a male ground terminal according to Embodiment 7.

A configuration and operation of the male ground terminal 22 according to Embodiment 7 of the male-type electrical connector 20 are described with reference to FIG. 12. FIG. 12 is a perspective view of the male ground terminal 22 according to Embodiment 7.

Note that FIG. 12 illustrates the male ground terminal 22, and illustration of the electrically-insulating male terminal holding part 23 (male holding member 21) is omitted. However, similarly to FIG. 10 related to Embodiment 6, the conductive member 31 of the male ground terminal 22 according to Embodiment 7 serves as the shielding part, and is held by the electrically-insulating male terminal holding part 23 (male holding member 21).

The male ground terminal 22 according to Embodiment 7 is described below, focusing on differences from the male ground terminal 22 according to Embodiment 6 illustrated in FIG. 11.

As illustrated in FIG. 12, the male ground terminal 22 includes the frame 28 projecting in a U-shape in side view, the cavity 27 formed inside the frame 28, and the conductive member 31 located at the cavity 27. The conductive member 31 is held by the holding member (not illustrated) provided to the cavity 27.

The conductive member 31 includes the top part 31*b*, the first upper arm part 31*c*, the second upper arm part 31*d*, the first corner 31*e*, the second corner 31*f*, the first lower arm part 31*g*, the second lower arm part 31*h*, and the bottom part 31*i*. The bottom part 31*i* connects the first lower arm part 31*g* to the second lower arm part 31*h* while extending in the lateral direction (transverse direction) orthogonal to the alignment direction of the male ground terminals 22. The bottom part 31*i* contacts the laterally connecting part 22*f*.

The gap 31*j* is formed in the top part 31*b* so that the gap 31*j* divides the top part 31*b* into two. By the gap 31*j* being provided to the top part 31*b*, the conductive member 31 becomes elastically deformable. Therefore, since the conductive member 31 elastically contacts the frame 28, stable electrical connection can be achieved. The conductive member 31 illustrated in FIG. 12 becomes a hexagon when a part corresponding to the gap 31*j* is imaginarily added to the top part 31*b*, and thus, it can be deemed to have a discontinuous polygonal shape where one side is omitted.

When the first corner 31*e* and the second corner 31*f* are gripped, the conductive member 31 elastically deforms such that the top parts 31*b* divided into two by the gap 31*j* become closer to each other. When the conductive member 31 is attached between the first outer lengthwise extending part 22*c* and the second outer lengthwise extending part 22*d* in this state, the conductive member 31 is elastically held between the first outer lengthwise extending part 22*c* and the second outer lengthwise extending part 22*d*. At this time, the first corner 31*e* contacts the first outer lengthwise extending part 22*c* and is electrically connected thereto, and the second corner 31*f* contacts the second outer lengthwise extending part 22*d* and is electrically connected thereto. In other words, the conductive member 31 contacts the inner surface of the frame 28 and is electrically connected thereto. Therefore, the ground potential of the conductive member 31 becomes lower, and isolation effect as a result of shielding by the conductive member 31 is improved.

As described above, the cavity 27 is provided with the electrically-insulating male terminal holding part 23 (male holding member 21). The conductive member 31 is provided to the cavity 27 in various methods. For example, an insertion hole which allows the conductive member 31 to contact the first outer lengthwise extending part 22*c* and the second outer lengthwise extending part 22*d* of the frame 28 by the conductive member 31 being inserted therein may be provided to the male terminal holding part 23 (male holding member 21) in advance. Then, by the conductive member 31 being inserted in the insertion hole, the conductive member 31 is held by the male terminal holding part 23 (male holding member 21). Further, by the conductive member 31 being insert-molded while being fixed to the frame 28 in advance, the conductive member 31 is held by the male terminal holding part 23 (male holding member 21). Note that the conductive member 31 is fixed to the frame 28 through soldering, welding, or the like.

In the male ground terminal 22 according to Embodiment 7 illustrated in FIG. 12, the bottom part 31*i* of the conductive member 31 is configured to contact the laterally connecting part 22*f* of the frame 28. Therefore, space formed between the conductive member 31 and the frame 28 is reduced, and the ground potential of the conductive member 31 becomes lower. Thus, electromagnetic shielding effect in the male ground terminal 22 is improved.

Moreover, similarly to Embodiment 6, since the cavity 27 formed at the frame 28 of the male ground terminal 22 is electromagnetically shielded by the conductive member (shielding part) 31 held by the holding member 21, sufficient isolation characteristics can be obtained without the connector being increased in size.

Male Ground Terminal According to Embodiment 8

Figure 13:
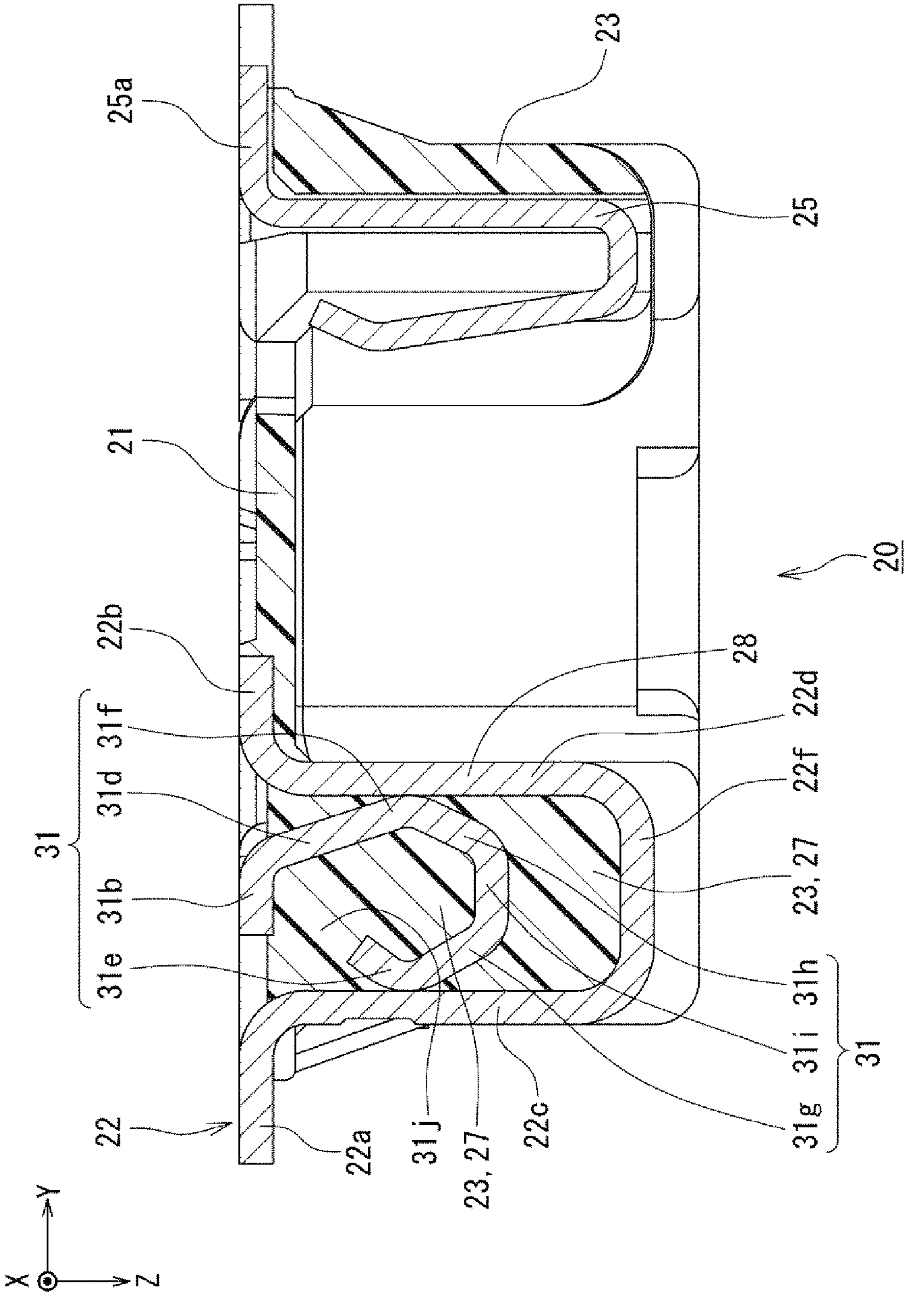
FIG. 13 is a sectional view of a male-type electrical connector including a male ground terminal according to Embodiment 8.
Figure 14:
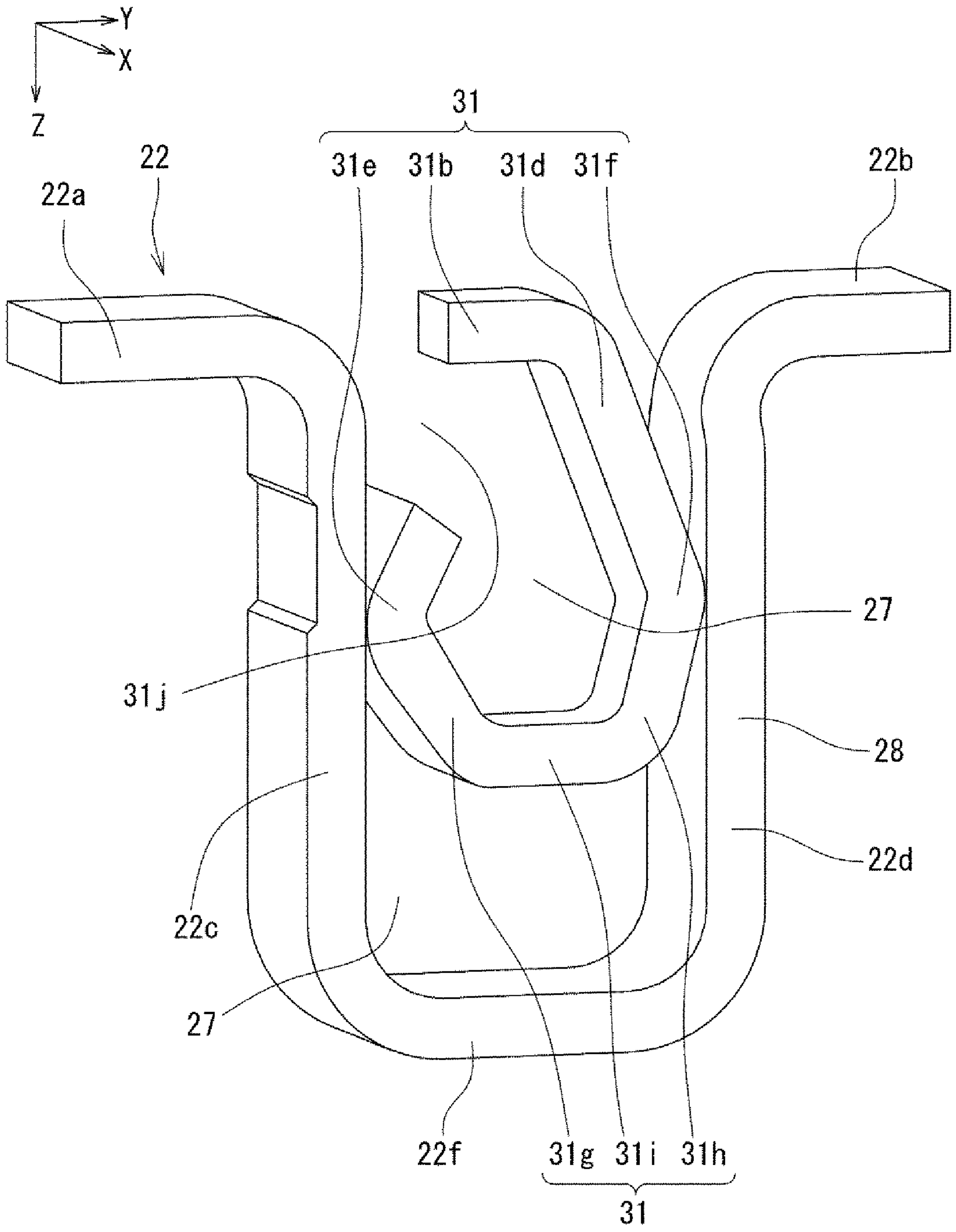
FIG. 14 is a perspective view of the male ground terminal according to Embodiment 8.

A configuration and operation of the male ground terminal 22 according to Embodiment 8 of the male-type electrical connector 20 are described with reference to FIGS. 13 and 14. FIG. 13 is a sectional view of the male-type electrical connector 20 including the male ground terminal 22 according to Embodiment 8. FIG. 14 is a perspective view of the male ground terminal 22 according to Embodiment 8.

The male ground terminal 22 according to Embodiment 8 is described below, focusing on differences from the male ground terminal 22 according to Embodiment 6 illustrated in FIGS. 10 and 11.

As illustrated in FIGS. 13 and 14, the male ground terminal 22 includes the frame 28 projecting in a U-shape in side view, the cavity 27 formed inside the frame 28, and the conductive member 31 located at the cavity 27. The conductive member 31 is held by the holding member (not illustrated) provided to the cavity 27.

The conductive member 31 includes the top part 31*b*, the second upper arm part 31*d*, the first corner 31*e*, the second corner 31*f*, the first lower arm part 31*g*, the second lower arm part 31*h*, and the bottom part 31*i*.

An end portion of the top part 31*b* on the first side and an upper-end portion of the first corner 31*e* are separated from each other to form the gap 31*j*. By the gap 31*j* being provided, the conductive member 31 becomes elastically deformable. Therefore, since the conductive member 31 elastically contacts the frame 28, stable electrical connection can be achieved.

Moreover, the conductive member 31 includes five sides (the top part 31*b*, the second upper arm part 31*d*, the first lower arm part 31*g*, the second lower arm part 31*h*, and the bottom part 31*i*). The conductive member 31 becomes a hexagon when the first upper arm part 31*c* corresponding to the gap 31*j* is imaginarily added, and thus, it can be deemed to have a discontinuous polygonal shape where one side is omitted.

When the first corner 31*e* and the second corner 31*f* are gripped, the conductive member 31 elastically deforms such that the first corner 31*e* and the second corner 31*f* become closer to each other. When the conductive member 31 is attached between the first outer lengthwise extending part 22*c* and the second outer lengthwise extending part 22*d* in this state, the conductive member 31 is elastically held between the first outer lengthwise extending part 22*c* and the second outer lengthwise extending part 22*d*. At this time, the first corner 31*e* contacts the first outer lengthwise extending part 22*c* and is electrically connected thereto, and the second corner 31*f* contacts the second outer lengthwise extending part 22*d* and is electrically connected thereto. In other words, the conductive member 31 contacts the inner surface of the frame 28 and is electrically connected thereto. Therefore, the ground potential of the conductive member 31 becomes lower, and isolation effect as a result of shielding by the conductive member 31 is improved.

As described above, the cavity 27 is provided with the electrically-insulating male terminal holding part 23 (male holding member 21). The conductive member 31 is provided to the cavity 27 in various methods. For example, an insertion hole which allows the conductive member 31 to contact the first outer lengthwise extending part 22*c* and the second outer lengthwise extending part 22*d* of the frame 28 by the conductive member 31 being inserted therein may be provided to the male terminal holding part 23 (male holding member 21) in advance. Then, by the conductive member 31 being inserted in the insertion hole, the conductive member 31 is held by the male terminal holding part 23 (male holding member 21). Further, by the conductive member 31 being insert-molded while being fixed to the frame 28 in advance, the conductive member 31 is held by the male terminal holding part 23 (male holding member 21). Note that the conductive member 31 is fixed to the frame 28 through soldering, welding, or the like.

Therefore, since the cavity 27 formed at the frame 28 of the male ground terminal 22 is electromagnetically shielded by the conductive member (shielding part) 31 held by the holding member 21, sufficient isolation characteristics can be obtained without the connector being increased in size.

Male Ground Terminal According to Embodiment 9

Figure 15:
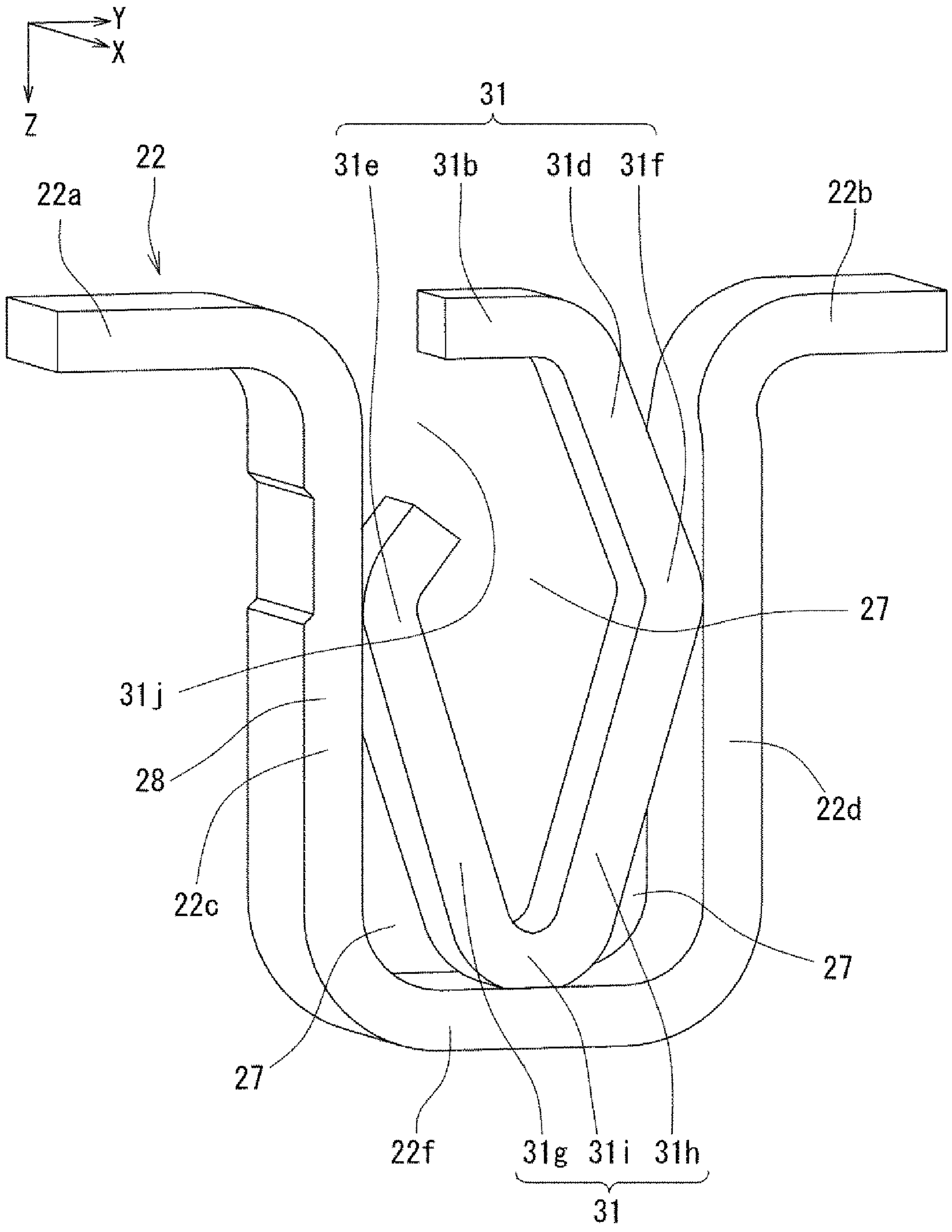
FIG. 15 is a perspective view of a male ground terminal according to Embodiment 9.

A configuration and operation of the male ground terminal 22 according to Embodiment 9 of the male-type electrical connector 20 are described with reference to FIG. 15. FIG. 15 is a perspective view of the male ground terminal 22 according to Embodiment 9.

Note that FIG. 15 illustrates the male ground terminal 22, and illustration of the electrically-insulating male terminal holding part 23 (male holding member 21) is omitted. However, similarly to FIG. 13 related to Embodiment 8, the conductive member 31 of the male ground terminal 22 according to Embodiment 9 serves as the shielding part, and is held by the electrically-insulating male terminal holding part 23 (male holding member 21).

The male ground terminal 22 according to Embodiment 9 is described below, focusing on differences from the male ground terminal 22 according to Embodiment 8 illustrated in FIG. 14.

As illustrated in FIG. 15, the male ground terminal 22 includes the frame 28 projecting in a U-shape in side view, the cavity 27 formed inside the frame 28, and the conductive member 31 located at the cavity 27. The conductive member 31 is held by the holding member (not illustrated) provided to the cavity 27.

The conductive member 31 includes the top part 31*b*, the second upper arm part 31*d*, the first corner 31*e*, the second corner 31*f*, the first lower arm part 31*g*, the second lower arm part 31*h*, and the bottom part 31*i*. The bottom part 31*i* connects the first lower arm part 31*g* to the second lower arm part 31*h*, and has a curved shape projecting in the lengthwise direction (height direction). The bottom part 31*i* contacts the laterally connecting part 22*f*.

An end portion of the top part 31*b* on the first side and an upper-end portion of the first corner 31*e* are separated from each other to form the gap 31*j*. By the gap 31*j* being provided, the conductive member 31 becomes elastically deformable. Therefore, since the conductive member 31 elastically contacts the frame 28, stable electrical connection can be achieved.

Moreover, the conductive member 31 includes four sides (the top part 31*b*, the second upper arm part 31*d*, the first lower arm part 31*g*, and the second lower arm part 31*h*). The conductive member 31 becomes a pentagon when the first upper arm part 31*c* corresponding to the gap 31*j* is imaginarily added, and thus, it can be deemed to have a discontinuous polygonal shape where one side is omitted.

When the first corner 31*e* and the second corner 31*f* are gripped, the conductive member 31 elastically deforms such that the first corner 31*e* and the second corner 31*f* become closer to each other. When the conductive member 31 is attached between the first outer lengthwise extending part 22*c* and the second outer lengthwise extending part 22*d* in this state, the conductive member 31 is elastically held between the first outer lengthwise extending part 22*c* and the second outer lengthwise extending part 22*d*. At this time, the first corner 31*e* contacts the first outer lengthwise extending part 22*c* and is electrically connected thereto, and the second corner 31*f* contacts the second outer lengthwise extending part 22*d* and is electrically connected thereto. In other words, the conductive member 31 contacts the inner surface of the frame 28 and is electrically connected thereto. Therefore, the ground potential of the conductive member 31 becomes lower, and isolation effect as a result of shielding by the conductive member 31 is improved.

As described above, the cavity 27 is provided with the electrically-insulating male terminal holding part 23 (male holding member 21). The conductive member 31 is provided to the cavity 27 in various methods. For example, an insertion hole which allows the conductive member 31 to contact the first outer lengthwise extending part 22*c* and the second outer lengthwise extending part 22*d* of the frame 28 by the conductive member 31 being inserted therein may be provided to the male terminal holding part 23 (male holding member 21) in advance. Then, by the conductive member 31 being inserted in the insertion hole, the conductive member 31 is held by the male terminal holding part 23 (male holding member 21). Further, by the conductive member 31 being insert-molded while being fixed to the frame 28 in advance, the conductive member 31 is held by the male terminal holding part 23 (male holding member 21). Note that the conductive member 31 is fixed to the frame 28 through soldering, welding, or the like.

Therefore, since the cavity 27 formed at the frame 28 of the male ground terminal 22 is electromagnetically shielded by the conductive member (shielding part) 31 held by the holding member 21, sufficient isolation characteristics can be obtained without the connector being increased in size.

Male Ground Terminal According to Embodiment 10

Figure 16:
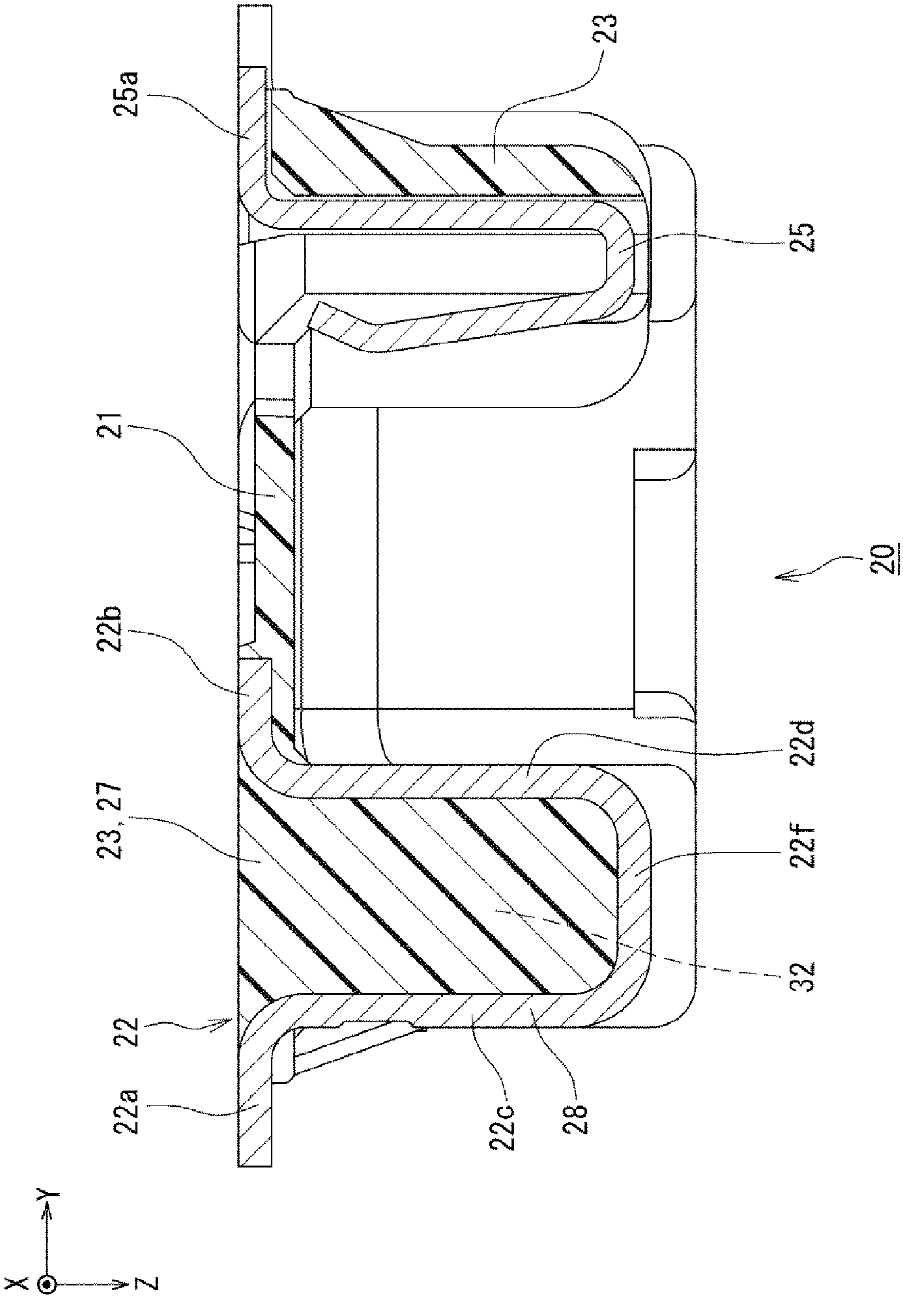
FIG. 16 is a sectional view of a male-type electrical connector including a male ground terminal according to Embodiment 10.
Figure 17:
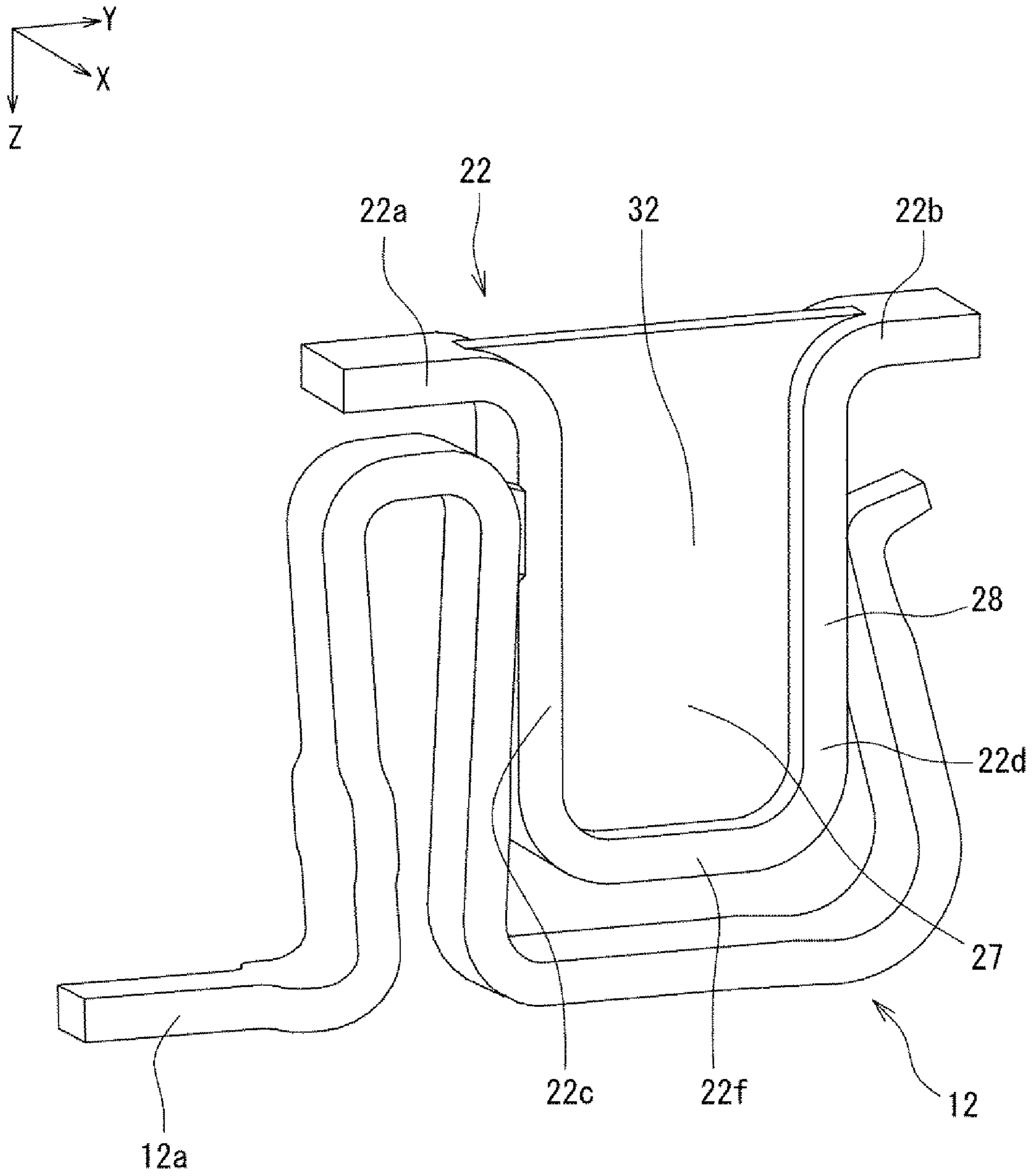
FIG. 17 is a perspective view illustrating engagement of the male ground terminal according to Embodiment 10 and a female ground terminal.

A configuration and operation of the male ground terminal 22 according to Embodiment 10 of the male-type electrical connector 20 are described with reference to FIGS. 16 and 17. FIG. 16 is a sectional view of the male-type electrical connector 20 including the male ground terminal 22 according to Embodiment 10. FIG. 17 is a perspective view illustrating engagement of the male ground terminal 22 according to Embodiment 10 and the female ground terminal 12.

The male ground terminal 22 according to Embodiment 10 is described below, focusing on differences from the male ground terminal 22 according to Embodiment 9 illustrated in FIG. 15.

As illustrated in FIGS. 16 and 17, the male ground terminal 22 includes the frame 28 projecting in a U-shape in side view, the cavity 27 formed inside the frame 28, and a covering part 32 located at the cavity 27. The covering part 32 is held by the male terminal holding part (terminal holding part) 23 provided to the cavity 27.

The covering part 32 which is separate from the frame 28 and has conductivity is provided to the cavity 27 of the frame 28. The covering part 32 serves as the conductive member 31 and serves as a conductive shielding part which electromagnetically shields the cavity 27. The covering part 32 is configured to planarly cover the cavity 27 substantially entirely. Therefore, the shielding effect by the conductive member 31 can be increased as much as possible.

For example, the covering part 32 is made by a plate-like member having conductivity being punched. For example, phosphor bronze may be used as the covering part 32. Phosphor bronze is elastically deformable material having conductivity. For example, gold plating or the like may be applied to a surface of the covering part 32.

The covering part 32 has a rectangular shape corresponding to the cavity 27 in a rectangular shape. For example, the covering part 32 is a plate-shaped body thinner than the frame 28 in the alignment direction (longitudinal direction) of the male ground terminals 22. The covering part 32 has steps with respect to surfaces of the frame 28 on both sides, respectively. In other words, the covering part 32 is located at a position dented with respect to the surfaces of the frame 28. The step formed between the surface of the covering part 32 and the surface of the frame 28 is provided with the electrically-insulating male terminal holding part 23 (male holding member 21).

When the covering part 32 is attached between the first outer lengthwise extending part 22*c* and the second outer lengthwise extending part 22*d*, the covering part 32 is held between the first outer lengthwise extending part 22*c* and the second outer lengthwise extending part 22*d*. At this time, a side of the covering part 32 on the first side contacts the first outer lengthwise extending part 22*c* and is electrically connected thereto, a side of the covering part 32 on the second side contacts the second outer lengthwise extending part 22*d* and is electrically connected thereto, and a bottom part of the covering part 32 contacts the laterally connecting part 22*f* and is electrically connected thereto. In other words, the three sides of the covering part 32 contact the inner surface of the frame 28 and are electrically connected thereto. Therefore, a ground potential of the covering part 32 becomes lower, and isolation effect as a result of shielding by the covering part 32 is improved.

As described above, the cavity 27 is provided with the electrically-insulating male terminal holding part 23 (male holding member 21). The covering part 32 is provided to the cavity 27 in various methods. For example, an insertion hole which allows the covering part 32 to contact the first outer lengthwise extending part 22*c*, the second outer lengthwise extending part 22*d*, and the laterally connecting part 22*f* of the frame 28 by the covering part 32 being inserted therein may be provided to the male terminal holding part 23 (male holding member 21) in advance. Then, by the covering part 32 being inserted in the insertion hole, the covering part 32 is held by the male terminal holding part 23 (male holding member 21). Further, by the covering part 32 being insert-molded while being fixed to the frame 28 in advance, the covering part 32 is held by the male terminal holding part 23 (male holding member 21). Note that the covering part 32 is fixed to the frame 28 through soldering, welding, or the like. Moreover, the covering part 32 may be formed integrally with the frame 28.

Therefore, since the cavity 27 formed at the frame 28 of the male ground terminal 22 is electromagnetically shielded by the covering part (shielding part) 32 held by the holding member 21, sufficient isolation characteristics can be obtained without the connector being increased in size.

Although the concrete embodiments of the present disclosure are described above, the present disclosure is not limited to the embodiments, but may be embodied by the embodiments which are variously changed within the scope of the present disclosure.

In the embodiments described above, bending and punching are illustrated as a forming method for the male ground terminal 22 having the projecting part 30, the conductive member 31, or the covering part 32. However, it may be formed through etching, welding, or the like.

In the above disclosure, the side corresponding to the top part 31*b*, the first upper arm part 31*c*, or the bottom part 31*i* has the gap 31*j*. However, the side corresponding to the second upper arm part 31*d*, the first lower arm part 31*g*, or the second lower arm part 31*h* may have the gap 31*j*.

In the above disclosure, both of the first outwardly protruding part 30*s* and the second outwardly protruding part 30*t* contact the frame 28. However, only one of the first outwardly protruding part 30*s* and the second outwardly protruding part 30*t* may contact the frame 28. Therefore, at least one of the first outwardly protruding part 30*s* and the second outwardly protruding part 30*t* can contact the frame 28. Thus, the ground potential of the projecting part 30 becomes lower, and isolation effect as a result of shielding by the projecting part 30 is improved.

In the above disclosure, the first lateral contact part 30*e*, the second laterally connecting part 30*f*, the top part 30*h*, the first inwardly protruding part 301, the second inwardly protruding part 30*m*, the first outwardly protruding part 30*s*, the second outwardly protruding part 30*t*, the top part 31*b*, and/or the bottom part 31*i* contact(s) the part(s) opposed thereto. However, it may physically be separated from each other.

In the above disclosure, the conductive member 31 has a discontinuous shape (for example, a polygonal shape) with the gap 31*j*. However, the conductive member 31 may have a discontinuous annular shape (for example, a circle or an ellipse) with the gap 31*j*.

In the above disclosure, it is described that, by the imaginary laterally connecting part 30*p* being provided imaginarily, the projecting part 30 which serves as the shielding part electromagnetically shields the cavity 27 formed inside the frame 28. However, in the cases of Embodiments 1 to 5 where the projecting part 30 serves as the shielding part, it may be deemed that the projecting part 30 is provided to the cavity 27 formed between the first outer lengthwise extending part 22*c* and the second outer lengthwise extending part 22*d*.

In the above disclosure, for example as illustrated in FIG. 10, the shape of the frame 28 of the male ground terminal 22 and the shape of the male signal terminal 25 are different from each other, thus an overlapping portion therebetween being small. However, the shape of the frame 28 of the male ground terminal 22 and the shape of the male signal terminal 25 may be the same (for example, in a U-shape). Therefore, the overlapping portion between the male ground terminal 22 and the male signal terminal 25 in side view becomes larger, and overlapping between the adjacent male signal terminals 25 opposed to each other becomes less, thus the isolation characteristics being obtained. In addition to this, by the shielding part 30, 31, or 32 being provided, further sufficient isolation characteristics can be obtained. Moreover, by making the shape of the frame 28 of the male ground terminal 22 and the shape of the male signal terminal 25 be the same as each other, the male ground terminal 22 and the male signal terminal 25 can be made at low cost.

In the above disclosure, the male signal terminals 25 and the male ground terminals 22 are disposed alternately. However, for example, the male signal terminal 25, the male ground terminal 22, the male ground terminal 22, and the male signal terminal 25 may be disposed in order.

In the above disclosure, for example, the female signal terminal 15 and the male ground terminal 22 are each attached through insert molding, and the female ground terminal 12 and the male signal terminal 25 are each attached through press fitting. However, attachment of these terminals 12, 15, 22, and 25 may be performed through a method suitably combining insert molding and press fitting.

Note that the male ground terminal 22 and the conductive member (shielding part) 31 may be formed as an integral component, and the male ground terminal 22 and the covering part 32 may also be formed as an integral component. Moreover, the female ground terminal 12 may have a shielding structure at the inverse U-shaped part adjacent to the U-shaped part to be engaged with the male ground terminal 22. The shielding structure provides an electromagnetically shielding function similarly to the electromagnetically shielding function of the male ground terminal 22 described above.

The present disclosure and embodiments can be summarized as follows.

The electrical connector 20 according to one aspect of the present disclosure includes the electrically-insulating holding member 21, and the signal terminal 25 and the male ground terminal 22 held by the holding member 21. The male ground terminal 22 is disposed next to the signal terminal 25. The male ground terminal 22 includes the frame 28 projecting in side view, and the cavity 27 formed inside the frame 28. The male ground terminal 22 includes the conductive shielding part 30, 31, or 32 configured to electromagnetically shield the cavity 27. The shielding part 30, 31, or 32 is located at the cavity 27 and held by the holding member 21 provided to the cavity 27.

In this configuration, the cavity 27 formed at the frame 28 of the male ground terminal 22 is electromagnetically shielded by the shielding part 30, 31, or 32 held by the holding member 21. Therefore, sufficient isolation characteristics can be obtained without the connector being increased in size.

Further, in the electrical connector 20 according to one embodiment, the shielding part 30 includes the projecting part 30 projecting from the laterally connecting part **22*f* of the frame 28 in a direction opposite from a projecting direction of the frame 28** in side view.

In this embodiment, the projecting part 30 is formed as a part of the frame 28. Therefore, making the shielding part 30 becomes easier.

Further, in the electrical connector 20 according to one embodiment, the projecting part 30 includes the first inner lengthwise extending part **30*g* and the second inner lengthwise extending part 30*i* opposed to each other. The first inner lengthwise extending part 30*g* includes the first inwardly protruding part 301 protruding toward the second inner lengthwise extending part 30*i*. The second inner lengthwise extending part 30*i* includes the second inwardly protruding part 30*m* protruding toward the first inner lengthwise extending part 30*g*. The first inwardly protruding part 301 and the second inwardly protruding part 30*m*** contact each other.

In this embodiment, the ground potential of the projecting part 30 becomes lower, and isolation effect as a result of shielding by the projecting part 30 is improved.

Further, in the electrical connector 20 according to one embodiment, the first inner lengthwise extending part **30*g* includes the first outwardly protruding part 30*s* protruding toward the frame 28 opposed thereto, and the second inner lengthwise extending part 30*i* includes the second outwardly protruding part 30*t* protruding toward the frame 28 opposed thereto. At least one of the first outwardly protruding part 30*s* and the second outwardly protruding part 30*t* contacts the frame 28**.

In this embodiment, the ground potential of the projecting part 30 becomes lower, and isolation effect as a result of shielding by the projecting part 30 is improved.

Further, in the electrical connector 20 according to one embodiment, the top part **30*h* of the projecting part 30** is electrically connected to a ground potential.

In this embodiment, the ground potential of the projecting part 30 becomes lower, and isolation effect as a result of shielding by the projecting part 30 is improved.

Further, in the electrical connector 20 according to one embodiment, the shielding part includes the conductive member 31 that is separate from the frame 28. The conductive member 31 contacts an inner surface of the frame 28.

In this embodiment, the ground potential of the conductive member 31 becomes lower, and isolation effect as a result of shielding by the conductive member 31 is improved.

Further, in the electrical connector 20 according to one embodiment, the conductive member 31 has a discontinuous shape with the gap **31*j*, and the conductive member 31 is elastically deformable by the gap 31*j***.

In this embodiment, since the conductive member 31 elastically contacts the frame 28, stable electrical connection can be achieved.

Further, in the electrical connector 20 according to one embodiment, the conductive member 31 includes the covering part 32 configured to planarly cover the cavity 27 in side view.

In this embodiment, the shielding effect by the conductive member 31 can be increased as much as possible.

Further, in the electrical connector 20 according to one embodiment, the top part **31*b* of the conductive member 31** is electrically connected to a ground potential.

In this embodiment, the ground potential of the conductive member 31 becomes lower, and isolation effect as a result of shielding by the conductive member 31 is improved.

Further, in the electrical connector 20 according to one embodiment, the shape of the signal terminal 25 and the shape of the male ground terminal 22 are the same as each other.

In this embodiment, the male ground terminal 22 and the signal terminal 25 can be made at low cost.

The electrical connector set 1 according to one aspect of the present disclosure includes the above-described electrical connector 20 and the opposing electrical connector 10 having the female ground terminal 12 configured to be insertably and removably engaged with the male ground terminal 22 of the electrical connector 20.

In this configuration, the cavity 27 formed at the frame 28 of the male ground terminal 22 is electromagnetically shielded by the shielding part 30 or 31 held by the holding member 21. Therefore, the electrical connector set 1 achievable of sufficient isolation characteristics without the connector being increased in size can be provided.

What is claimed is:

1. An electrical connector comprising:

a holding member that is electrically insulating; and two signal terminals and a male ground terminal held by the holding member, wherein an entirety of the male ground terminal is disposed between and adjacent to the two signal terminals, the male ground terminal includes a first outer lengthwise extending part and an opposed second outer lengthwise extending part which are spaced from each other such that the first outer lengthwise extending part and the second outer lengthwise extending part are insertably and removably engageable with a single female ground terminal of an opposing electrical connector, the male ground terminal includes a frame defining a cavity between the first outer lengthwise extending part and the second outer lengthwise extending part inside the frame, the male ground terminal includes a shielding part that is conductive and configured to electromagnetically shield the cavity, and the shielding part is located at the cavity and held by the holding member at the cavity.

2. The electrical connector according to claim 1, wherein the shielding part includes a projecting part projecting from a laterally connecting part of the frame in a direction opposite from a projecting direction of the frame.

3. The electrical connector according to claim 2, wherein a top part of the projecting part is electrically connected to a ground potential.

4. The electrical connector according to claim 2, wherein the projecting part includes a first inner lengthwise extending part and a second inner lengthwise extending part, the first inner lengthwise extending part includes a first inwardly protruding part protruding toward the second inner lengthwise extending part, the second inner lengthwise extending part includes a second inwardly protruding part protruding toward the first inner lengthwise extending part, and the first inwardly protruding part and the second inwardly protruding part contact each other.

5. An electrical connector set comprising:

the electrical connector according to claim 2; and an opposing electrical connector having a female ground terminal configured to insertably and removably engage with the male ground terminal of the electrical connector.

6. The electrical connector according to claim 1, wherein the shielding part includes a projecting part, the projecting part includes the first inner lengthwise extending part and the second inner lengthwise extending part, the first inner lengthwise extending part includes a first inwardly protruding part protruding toward the second inner lengthwise extending part, the second inner lengthwise extending part includes a second inwardly protruding part protruding toward the first inner lengthwise extending part, and the first inwardly protruding part and the second inwardly protruding part contact each other.

7. The electrical connector according to claim 6, wherein a top part of the projecting part is electrically connected to a ground potential.

8. An electrical connector set comprising:

the electrical connector according to claim 6; and an opposing electrical connector having a female ground terminal configured to insertably and removably engage with the male ground terminal of the electrical connector.

9. The electrical connector according to claim 1, wherein the shielding part includes a conductive member that is separate from the frame, and the conductive member contacts an inner surface of the frame.

10. The electrical connector according to claim 9, wherein the conductive member has a discontinuous shape with a gap, and p1 the conductive member is elastically deformable by the gap.

11. The electrical connector according to claim 10, wherein a top part of the conductive member is electrically connected to a ground potential.

12. The electrical connector according to claim 9, wherein the conductive member includes a covering part configured to planarly cover the cavity.

13. The electrical connector according to claim 12, wherein a top part of the conductive member is electrically connected to a ground potential.

14. The electrical connector according to claim 9, wherein a top part of the conductive member is electrically connected to a ground potential.

15. An electrical connector set comprising:

the electrical connector according to claim 1; and an opposing electrical connector having a female ground terminal configured to insertably and removably engage with the male ground terminal of the electrical connector.

16. An electrical connector comprising:

a holding member that is electrically insulating; and a signal terminal and a male ground terminal held by the holding member, wherein the male ground terminal is disposed next to the signal terminal, the male ground terminal includes a frame defining a cavity inside the frame, the male ground terminal includes a shielding part that is conductive and configured to electromagnetically shield the cavity, the shielding part is located at the cavity and held by the holding member at the cavity, the shielding part includes a projecting part, the projecting part includes a first inner lengthwise extending part and a second inner lengthwise extending part, the first inner lengthwise extending part includes a first inwardly protruding part protruding toward the second inner lengthwise extending part, the second inner lengthwise extending part includes a second inwardly protruding part protruding toward the first inner lengthwise extending part, the first inwardly protruding part and the second inwardly protruding part contact each other, the first inner lengthwise extending part includes a first outwardly protruding part protruding toward the frame opposed to the first outwardly protruding part, the second inner lengthwise extending part includes a second outwardly protruding part protruding toward the frame opposed to the second outwardly protruding part, and at least one of the first outwardly protruding part and the second outwardly protruding part contacts the frame.

17. The electrical connector according to claim 16, wherein a top part of the projecting part is electrically connected to a ground potential.

* * * * *